US005602995A

United States Patent [19]

Hendel et al.

[11] Patent Number: 5,602,995
[45] Date of Patent: *Feb. 11, 1997

[54] METHOD AND APPARATUS FOR BUFFERING DATA WITHIN STATIONS OF A COMMUNICATION NETWORK WITH MAPPING OF PACKET NUMBERS TO BUFFER'S PHYSICAL ADDRESSES

[75] Inventors: Ariel Hendel, Ronkonkoma; Kenneth W. Brinkerhoff, Hauppauge, both of N.Y.

[73] Assignee: Standard Microsystems Corporation, Hauppauge, N.Y.

[*] Notice: The term of this patent shall not extend beyond the expiration date of Pat. No. 5,313,582.

[21] Appl. No.: 242,496

[22] Filed: May 13, 1994

Related U.S. Application Data

[63] Continuation of Ser. No. 693,637, Apr. 30, 1991, Pat. No. 5,313,582.

[51] Int. Cl.⁶ .................................................. G06F 12/02
[52] U.S. Cl. .................. 395/250; 395/200.2; 364/239; 364/DIG. 1; 364/242.95
[58] Field of Search ................................... 395/225, 200, 395/250, 200.2

[56] References Cited

U.S. PATENT DOCUMENTS

| | | | |
|---|---|---|---|
| 4,449,182 | 5/1984 | Rubinson et al. | 395/250 |
| 4,516,201 | 5/1985 | Warren et al. | 395/200.2 |
| 4,630,261 | 12/1986 | Irvin | 370/81 |
| 4,641,307 | 2/1987 | Russell | 370/60 |
| 4,652,874 | 3/1987 | Loyer | 340/825.05 |
| 4,704,717 | 11/1987 | King, Jr. | 370/94.1 |
| 4,809,155 | 2/1989 | Costes et al. | 395/847 |
| 4,814,980 | 3/1989 | Peterson et al. | 395/200.03 |
| 4,855,904 | 8/1989 | Daberkow et al. | 395/375 |
| 4,864,495 | 9/1989 | Inaba | 395/250 |
| 4,922,503 | 5/1990 | Leone | 370/85.13 |
| 5,175,818 | 12/1992 | Kunimoto et al. | 395/200 |
| 5,247,626 | 9/1993 | Firoozmand | 395/250 |

OTHER PUBLICATIONS

Specification pamphlet of the Intel 82596DX and 82596SX High-Performance 32-Bit Local Area Network Coprocessor, by Intel Corporation, Dec. 1989.

Specification pamphlet of Intel Advanced CSMA/CD LAN Controller with 16-Bit Data Path, by Intel Corporation, Oct. 1988.

Primary Examiner—Thomas C. Lee
Assistant Examiner—D. Dinh
Attorney, Agent, or Firm—Hopgood, Calimafde, Kalil & Judlowe

[57] ABSTRACT

Method and apparatus for buffering data packets in a data communication controller environment. In general, the communication controller is interfaceable with a host processor and includes a control unit for accessing a communication medium. Each data packet to be transmitted or received is assigned a unique packet number. Packet number assignment is carried out by a memory management unit which dynamically allocates to each assigned packet number, one or more pages in data packet buffer memory for the storage of the corresponding data packet. If requested storage space is unavailable at the time of request, the memory management unit will allocate a page or pages to an available packet number as the pages become free. Upon issuing the assigned packet number, the physical addresses of the allocated pages of buffer memory storage space are generated in a manner transparent to both the host processor and the control unit. With these physical addresses, a data packet can be accessed from buffer memory, in a simple manner. Upon completion of each data packet loading operation, the corresponding packet number is stored in a packet number queue maintained for subsequent retrieval in order to generate the physical addresses at which the corresponding data packet has been stored.

42 Claims, 23 Drawing Sheets

FIG. 7B

| $A_i(B_i)$ | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Unique data packet numbers, $N_{Ti}$ and $N_{Rj}$ | | | | | | | | | | | | | | | | | | |
| 1st page of packet, 000 | | $C_0$ | $C_3$ | $C_6$ | $C_{16}$ | | | | | | | | | | | | | |
| 2nd page of packet, 001 | | $C_1$ | $C_5$ | $C_7$ | $C_{17}$ | | | | | | | | | | | | | |
| 3rd page of packet, 010 | | $C_2$ | $C_8$ | $C_{14}$ | | | | | | | | | | | | | | |
| 4th page of packet, 011 | | $C_{11}$ | | | | | | | | | | | | | | | | |
| 5th page of packet, 100 | | $C_{10}$ | | | | | | | | | | | | | | | | |
| 6th page of packet, 101 | | $C_{15}$ | | | | | | | | | | | | | | | | |
| 7th page of packet, 110 | | | | | | | | | | | | | | | | | | |
| 8th page of packet, 111 | | | | | | | | | | | | | | | | | | |

FIG. 7C

| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Physical page address, $C_k$ | 0 | 1 | 2 | 3 | 4 | 5 | 6 | 7 | 8 | 9 | 10 | 11 | 12 | 13 | 14 | 15 | 16 | 17 |
| Physical page status = free | 0 | 0 | 0 | 0 | 0 | 0 | 0 | 0 | 0 | 0 | F | F | F | F | F | F | | |
| Data packet occupier ($N_{Ti}$, $N_{Rj}$) | 0 | 0 | 1 | 2 | 2 | 3 | 3 | 2 | 0 | 0 | 0 | | | | 3 | 0 | 4 | 4 |

FIG. 10B

| $A_{Ti}$ ($A_{Rj}$) | 0 | 1 | 2 | 3 | 4 | 5 | 6 | 7 | 8 | 9 | 10 | 11 | 12 | ... | 28 | 29 | 30 | 31 |
|---|---|---|---|---|---|---|---|---|---|---|---|---|---|---|---|---|---|---|
| PHYSICAL PAGE ADDRESS ($C_K$) TO WHICH DATA PACKET HAS BEEN ALLOCATED USING DATA PACKET NUMBER | | $C_9$ | $C_{28}$ | $C_5$ | $C_{29}$ | | | | | | | | | | | | | |

UNIQUE DATA PACKET NUMBERS, $N_{Ti}$ AND $N_{Rj}$

FIG. 10C

| PHYSICAL PAGE ADDRESS, $C_K$ | 0 | 1 | 2 | 3 | 4 | 5 | 6 | 7 | 8 | 9 | 10 | 11 | 12 | ... | 28 | 29 | 30 | 31 |
|---|---|---|---|---|---|---|---|---|---|---|---|---|---|---|---|---|---|---|
| PHYSICAL PAGE STATUS F=FREE | F | | F | F | F | | F | F | F | | F | F | F | | | | F | F |
| DATA PACKET OCCUPIER ($N_{Ti}$, $N_{Rj}$) | | | | | | 2 | | | | 0 | | | | | 1 | 3 | | |

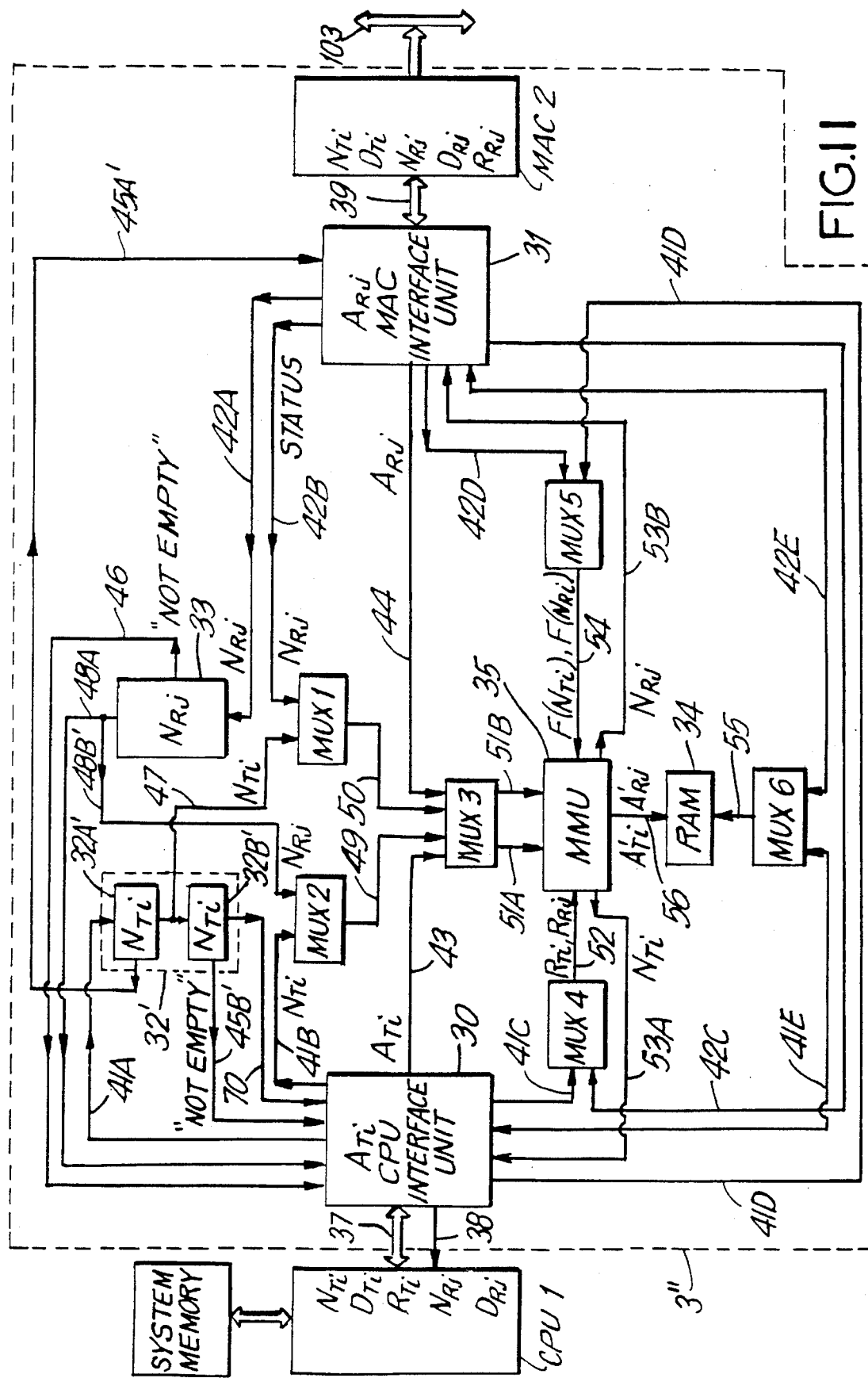

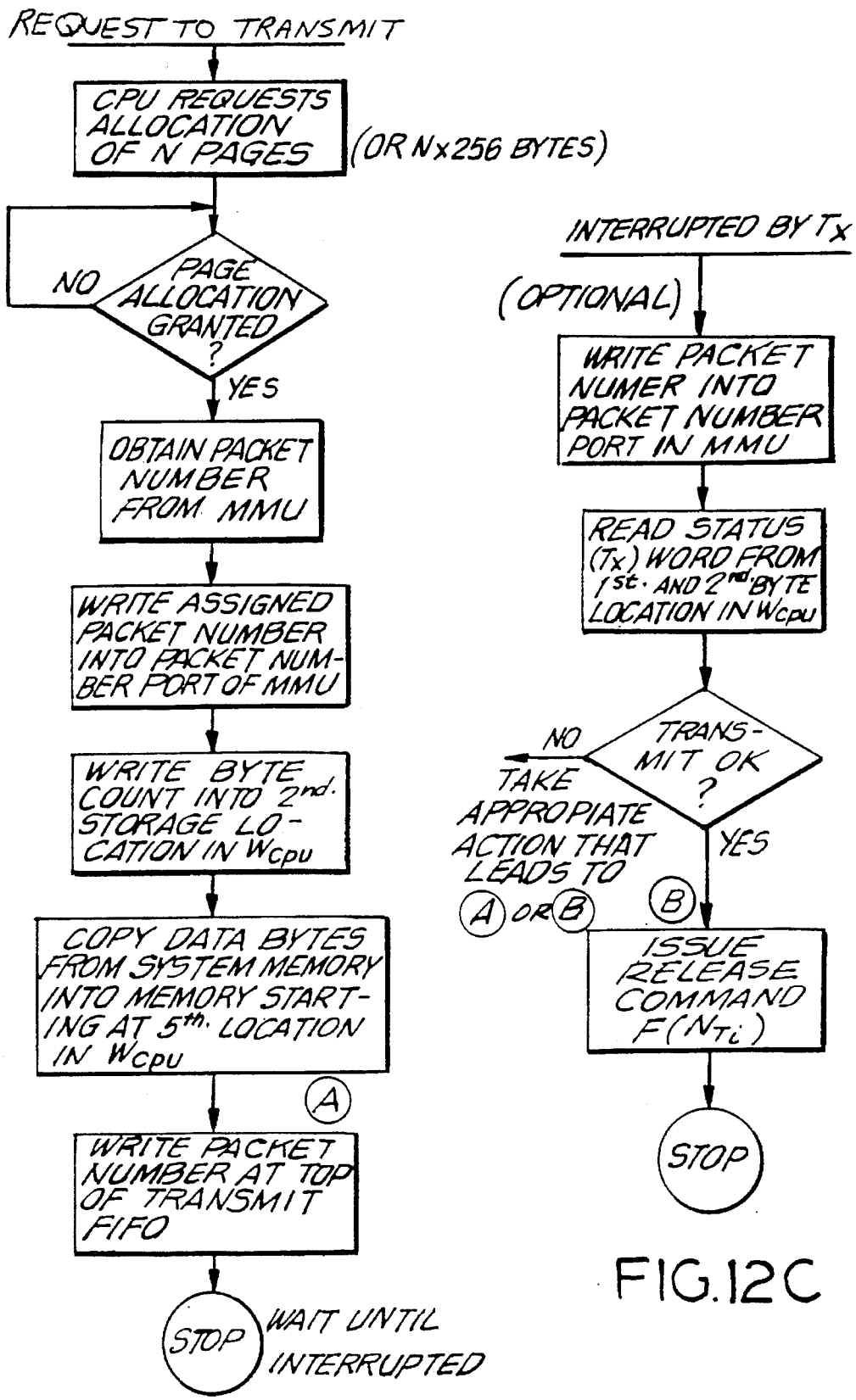

5,602,995

METHOD AND APPARATUS FOR BUFFERING DATA WITHIN STATIONS OF A COMMUNICATION NETWORK WITH MAPPING OF PACKET NUMBERS TO BUFFER'S PHYSICAL ADDRESSES

This is a continuation of application Ser. No. 07/693,637 entitled "METHOD AND APPARATUS FOR BUFFERING DATA WITHIN STATIONS OF A COMMUNICATION NETWORK" filed on Apr. 30, 1991, issued as U.S. Pat. No. 5,313,582 on May 17, 1994.

BACKGROUND OF THE INVENTION

1. Field of Invention

The present invention generally concerns a method and apparatus for buffering data within stations of a communications network, and more particularly to such a method and apparatus which enables each station to receive and transmit consecutive data packets in a manner less sensitive to processor interrupt latency, while optimally using memory and minimizing host processor overhead and necessity of copying data between structures.

2. Brief Description of the Prior Art

Local-area networks (LAN) are communication systems for enabling data-processing devices, such as computer workstations, to communicate with each other through a communication (e.g. transmission) media. Data-processing devices in such networks are typically referred to as nodes or stations, and many such stations are likely to be relatively autonomous, requiring communication with other stations only occasionally. Other stations may require more frequent communication, and the amount of communication required by a particular station can vary from time to time.

In many local area networks, stations can be easily added to, removed from, and moved from place to plate within the network. While there are numerous local area networks presently known, they can be classified into two general types. The first type of network is referred to as a "centralized network" which is characterized by the requirement of a centralized network controller which implements the network protocol. The second type of local area network is referred to as a "distributed network" which does not require a centralized network controller, and instead provides each station within the network with a communication controller having a medium access control (MAC) unit that locally implements the network protocol within each communication controller.

In a distributed local area network, packet switching is a technique commonly employed to dynamically allocate the communication resources of the network among multiple communicating stations. According to this technique, messages to be communicated between stations are partitioned (by the transmitting station's processor) into packets, having a fixed maximum size. The packets are then ascribed a station (i.e. source) identifier. The packets are then placed on the communication medium by the station's communication controller. Such packets are then sensed and selectively processed by the communication controller of the destination station in the network.

Any packet from one station to another station contains various fields of information specified in accordance with a predetermined network protocol. The information typically includes the identity of the source station, the identity of the destination station, and various other information concerning the characteristics of the packet. In some network protocols, a number of different types of packets may appear on the communication medium in accordance with the network protocol. Typically, these packets relate to either communication control or data-transfer functions.

To more fully appreciate the problems associated with conventional communication controllers used in the stations of distributed local-area-networks, reference is made to FIGS. 1 through 3.

In FIG. 1, a distributed local area-network 100 is shown, comprising a plurality of stations (i.e. nodes 102A through 102M) which are operably associated to a communication medium 103, such as a cable. In FIG. 2, each station is shown to generally comprise a host processor (e.g., CPU) 104, a program memory 105, a system memory 106, a communication controller 107, a system bus 108, and a communication medium interface unit 109. The processor, program memory and system memory are each associated with a system bus 108, and the system bus, in turn, is interfaced with communication controller 107, as shown. The communication controller is interfaced with the communication medium by way of the communication medium interface unit. Typically, the communication medium interface unit is suitably adapted for the particular characteristics of the communication medium being employed in the network.

In general, communication controllers, and LAN controllers in particular, are usually integrated into a system architecture and software environment by providing the means for supporting two independent data queues in software: a transmit queue and a receive queue. Each queue is associated with a process, namely, the transmit process and the receive process of the low-level software communications driver.

The transmit queue holds the elements that the software intends to transmit. In a packet-switched environment of a local area network, these elements are usually data packets that include a block of data to be transmitted and some associated information like the destination for the block of data. The receive queue hold the elements that the station has received, again usually packets with a block of data and associated information such as the sender of the data block.

Elements are added to the transmit queue by the software driver whenever it needs to transmit information. Elements are removed from the transmit queue after successful transmission is assumed. Removal of the elements can be done either by the low-level software driver or by the communication controller. Elements are added to the receive queue by the communication controller whenever a relevant packet is received, and are removed by the low-level software driver upon processing the packet.

The transmit and receive queues are managed by software in system memory, and eventually meet the communication controller. The interface between the queues and the communications controller determines the behavior of the queues during the addition of receive elements and removal of transmit elements.

Management of the transmit and receive queue elements at the level of the communication controller has been attempted in a variety of ways.

For example, some prior art communication controllers are as simple as a single element queue, in which the controller can handle only one transmit and one receive element at a time and the host processor must be involved in feeding the queue. Representative of this type of prior art is the 90C65 Communication Controller from Standard Microsystems Corporation of Hauppauge, N.Y. A major shortcoming of this type of communication controller is that it is highly sensitive to interrupt latency of the host processor.

An alternative type of prior art communication controller employs queues for transmit and receive commands while storing corresponding data packets in a randomly accessible memory associated with the communication controller. Representative of this type of prior art is the 90C66 Communication Controller from Standard Microsystems. Advantageously, this communication controller design is substantially less sensitive to interrupt latency in comparison with the above-described communication controller.

Using an altogether different technique than the command queuing scheme described above, the prior art has sought to extend the transmit and receive data queues into the communication controller by simulating transmit and receive data queues in the data packet buffer memory of the communication controller. In general, there have been several different approaches to implementing this generalized memory management technique.

For example, according to one approach, many transmit and receive data elements can be managed as a "ring buffer," in which data packet buffer memory is configured as a number of memory elements which can be sequentially allocated and accessed. Prior art representative of this approach includes the 8390 NIC Communication Controller from National Semiconductor Corporation, and the Etherstar® Ethernet Communications Controller from Fujitsu Corporation. Significant shortcomings and drawbacks of the "ring buffer" communication controller are inefficient memory utilization, high CPU overhead and memory fragmentation.

According to an alternative approach for simulating transmit and receive data queues at the communication controller level, a disjointed array of memory storage locations are linked together with the use of address pointers compiled in accordance with a "linked list". The major subcomponents of such a conventional "link-list" communication controller 107' are shown in FIG. 3. In general, communication controller 107' comprises a CPU interface unit 110, a link-list processor 111, a medium access control (MAC) unit 112, and a MAC interface unit 114. Associated with the controller is a data packet buffer memory (RAM) 113. The CPU interface unit interfaces system bus 108 with the link-list processor and the data packet memory buffer by way of an address and data bus, as shown. The MAC interface unit interfaces the medium access control unit 109 with the link-list processor and the data packet buffer memory, also by way of an address and data bus, as shown. Prior art representative of the above type device includes the 82586 and 82596 Communication Controllers from Intel Corporation.

In order for the link-list communication controller to find the memory storage location where a packet begins, as well as the storage locations where each one of the buffers (comprising a packet) begins, the software driver must perform a number of computations. Such packet address computations and the necessity of managing numerous address pointers create high software overhead. Also with this prior art approach, memory utilization is inefficient owing to the fact that pointers and link-list structures utilize memory and due to the fact that link-lists use fixed memory allocations between transmit and receive queues.

Thus, there is a great need in the art for a communication controller that can efficiently manage its data packet buffer memory and interface with transmit and receive queues in system memory, while buffering data packets in a manner which is characterized by simplicity, high performance, flexibility, low software overhead, and efficient memory utilization.

Accordingly, it is a primary object of the present invention to provide a method and apparatus for buffering data packets in a communication controller in a way which generally satisfies the above-described criteria.

It is a further object of the present invention to provide such a method and apparatus of buffering data packets in a communication controller, in a way which transmit and receive data queues can be managed independently of the host processor (CPU), and insensitive to its interrupt latency time.

It is a further object of the present invention to provide such a method and apparatus of buffering data packets in a communication controller, in which data packet buffer memory is dynamically allocated so as to optimize memory utilization without burden on the host processor.

A further object of the present invention is to provide such a method and apparatus of buffering data packets in a communication controller in which data packet buffer memory appears to the host processor as two linearly mapped fixed-length regions of memory space for the transmit and receive queues, respectively, while in actuality, the size of the buffer memory is much greater, and the data page storage locations for each data packet are arbitrarily assigned, need not be contiguous, and number thereof is dependent on the actual length of the data packet to be stored.

A further object of the present invention is to provide such method and apparatus in the form of a communication controller, in which buffer memory space between transmit and receive data packet queues is shared and dynamically allocated to optimize memory utilization.

A further object of the present invention is to provide such a communication controller, in which dynamic allocation of buffer memory is transparent to the host processor and the medium access control unit of the communication controller.

These and other objects of the present invention will become apparent hereinafter.

SUMMARY OF INVENTION

According to one of the broader aspects of the present invention, a method of buffering data packets in a communication controller is provided. In the illustrated embodiments, the communication controller is interfaced with a processor for processing data packets, and includes a control unit for accessing a communication medium.

In general, the method comprises providing a data packet storage means which is operably associated with the communication controller. The data storage means includes a plurality of data page storage locations. A packet number is assigned to a data packet to be stored in one or more data page storage locations. Then, the data packet is stored in one or more of the data page storage locations. These one or more data page storage locations are specified by the corresponding packet number assigned to the data packet. After storing the data packet, the packet number assigned to the data packet is stored in a packet number queue which is maintained in the communication controller. The packet number queue is capable of storing one or more of the packet numbers, with each packet number corresponding to one stored data packet. Then, sometime later, the packet number is retrieved from the packet number queue and used to access the data packet from the one or more data page storage locations specified by the retrieved packet number.

In a preferred embodiment, the packet number queue has a depth sufficient to queue a plurality of packet numbers, each of which corresponds to a data packet stored in data packet storage means. For each data packet to be stored (i.e. loaded) and subsequently retrieved (i.e. unloaded) the above process is carried out, although not necessarily in sequential order.

Preferably, the data storage locations and packet numbers are dynamically allocated. In such an embodiment, the number of data page storage locations required to store each data packet is first determined. The required number of free data page storage locations are then allocated for storing the data packet. Thereafter, the unique packet number is assigned to each allocated data page storage location. In addition to dynamic packet number and page storage location allocation, linear-to-physical address conversion is employed to create memory access windows in the data packet storage means. In this way, writing into or reading from the data packet storage means appears as if accessing a fixed memory storage space, when in fact, the actual physical storage locations being accessed are situated elsewhere in buffer memory, unbeknownst to both the processor and the medium access control unit.

Preferably, a pair of packet number queues are independently maintained for packet numbers assigned to transmit and receive data packets, respectively. In this way, using dynamic packet number and page allocation, variable length transmit and receive data packet queues can be effectively maintained in the data packet storage buffer. Consequently, memory utilization is according to first-come-first-serve principles.

According to another aspect of the present invention, a high performance communication controller is provided. In the illustrated embodiments, the communication controller is interfaceable with a host processor and is operably associable with a data packet storage means including a plurality of data page storage locations for storing one or more data packets.

In general, the communication controller comprises a control unit, a memory management means, data packet transfer means, a packet number queue, and packet number transfer means. The control unit is for accessing a communication medium. The memory management means manages the data packet storage means by assigning a packet number to each data packet to be stored therein and by allocating one or more of the data page storage locations for storing each said data packet. The packet numbers are accessible to one or both of the processor and the control unit.

The data packet transfer means is provided for transferring one or more data packets between the processor and the data packet storage means. Also, the data packet transfer means facilitates transferring one or more data packets between the data packet storage means and the control unit. The packet number queue facilitates storage of one or more packet numbers, each of which corresponds to a stored data packet. The packet number transfer means, on the other hand, facilitates transferring packet numbers between the packet number queue and at least one of the control unit and the processor, and between the memory management unit and at least one of the control unit and the processor.

In an illustrated embodiment, packet number queues are provided for both transmit and receive data packets, and packet numbers are assigned by the memory management unit. The memory management means provides memory access windows into the data packet storage means so that the actual physical storage locations are transparent to the processor and the control unit. Such memory access windows are realized by providing the memory management means with a linear-to-physical address conversion unit that maps linear addresses into physical addresses.

According to another aspect of the present invention, a data communication controller is disclosed, having a mechanism for automatically generating transmit interrupts to the host processor upon the completion of any preselected number of data packet transmissions determined by the host processor. The mechanism utilizes a transmit packet number queue structure having first and second storage locations for removing packet numbers. In one embodiment, the mechanism is adapted to automatically generate a transmit interrupt upon transmission of the data packets associated with each particular record or packet sequence transmitted by the host processor.

BRIEF DESCRIPTION OF THE DRAWINGS

For a more complete understanding of the present invention, the detailed description of the illustrated embodiment is to be taken in connection with the following drawings, in which:

FIG. 7B is a schematic representation of an address conversion table implemented in the address conversion unit shown in FIG. 7A;

FIG. 7C is a schematic representation of a packet number and physical page allocation table implemented in the page allocation and management unit shown in FIG. 7A;

FIG. 10B is a schematic representation of an address conversion table implemented in the address conversion unit shown on FIG. 10A;

FIG. 10C is a schematic representation of a packet number and page allocation table implemented in the page allocation and management unit shown in FIG. 10A;

FIG. 11 is a block functional diagram of the communication controller according to the third embodiment of the present invention, showing transmit and receive packet number queues in operable association with the CPU interface unit so as to automatically generate transmit interrupts to the host processor in a flexible manner;

FIG. 11B is a block functional diagram of the transmit and receive packet number queues and CPU interface unit of an alternative embodiment of the communication controller of FIG. 11;

FIG. 12A is a flow control diagram illustrating operations undertaken by the host processor during loading of a transmit data packet into the data packet buffer memory of the communication controllers of FIGS. 7, 10 and 11;

FIG. 12C is a flow control diagram illustrating optional operations undertaken by the host processor, upon receipt of an interrupt, in order to determine status of a particular transmit data packet;

DETAILED DESCRIPTION OF THE ILLUSTRATED EMBODIMENTS

Figure 1:
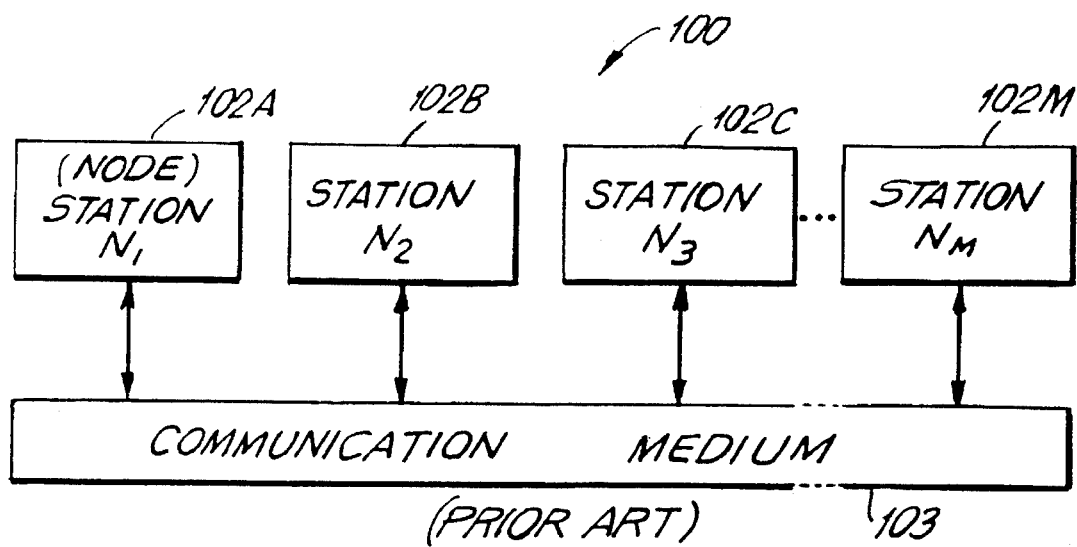
FIG. 1 is a schematic representation of a local area network system permitting a plurality of stations to access to a shared communication medium allocated in accordance with a network protocol.
Figure 2:
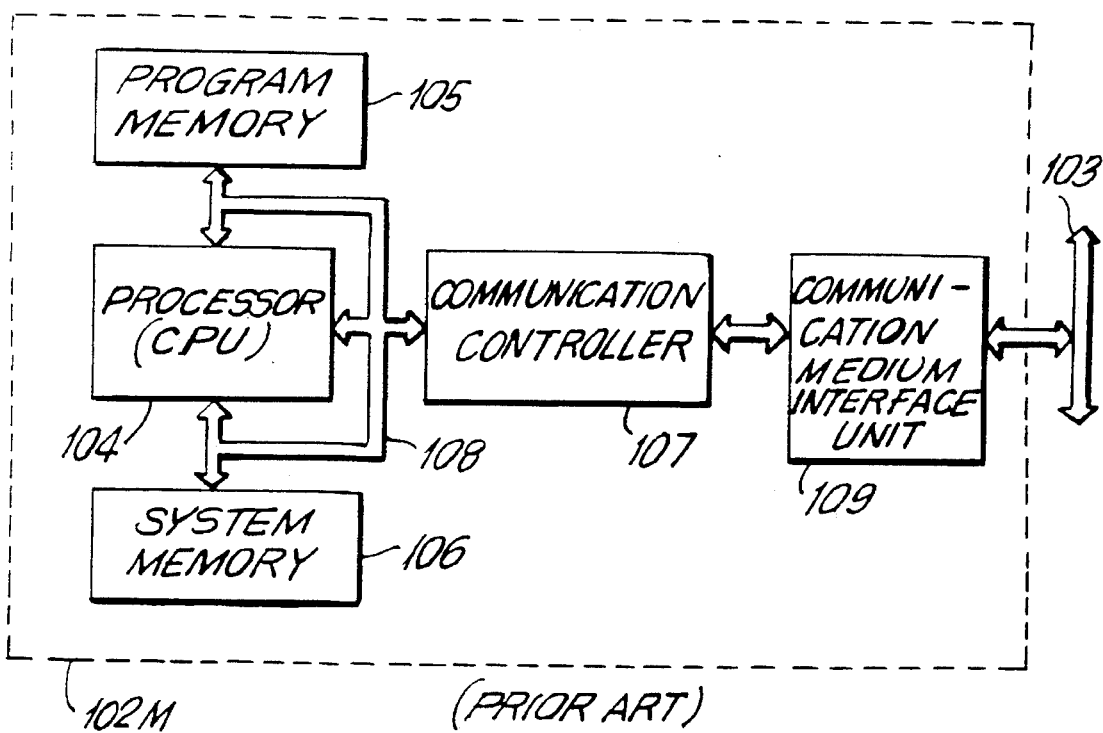
FIG. 2 is a block functional diagram of a prior art station within the local area network of FIG. 1, showing the major components of the station.
Figure 3:
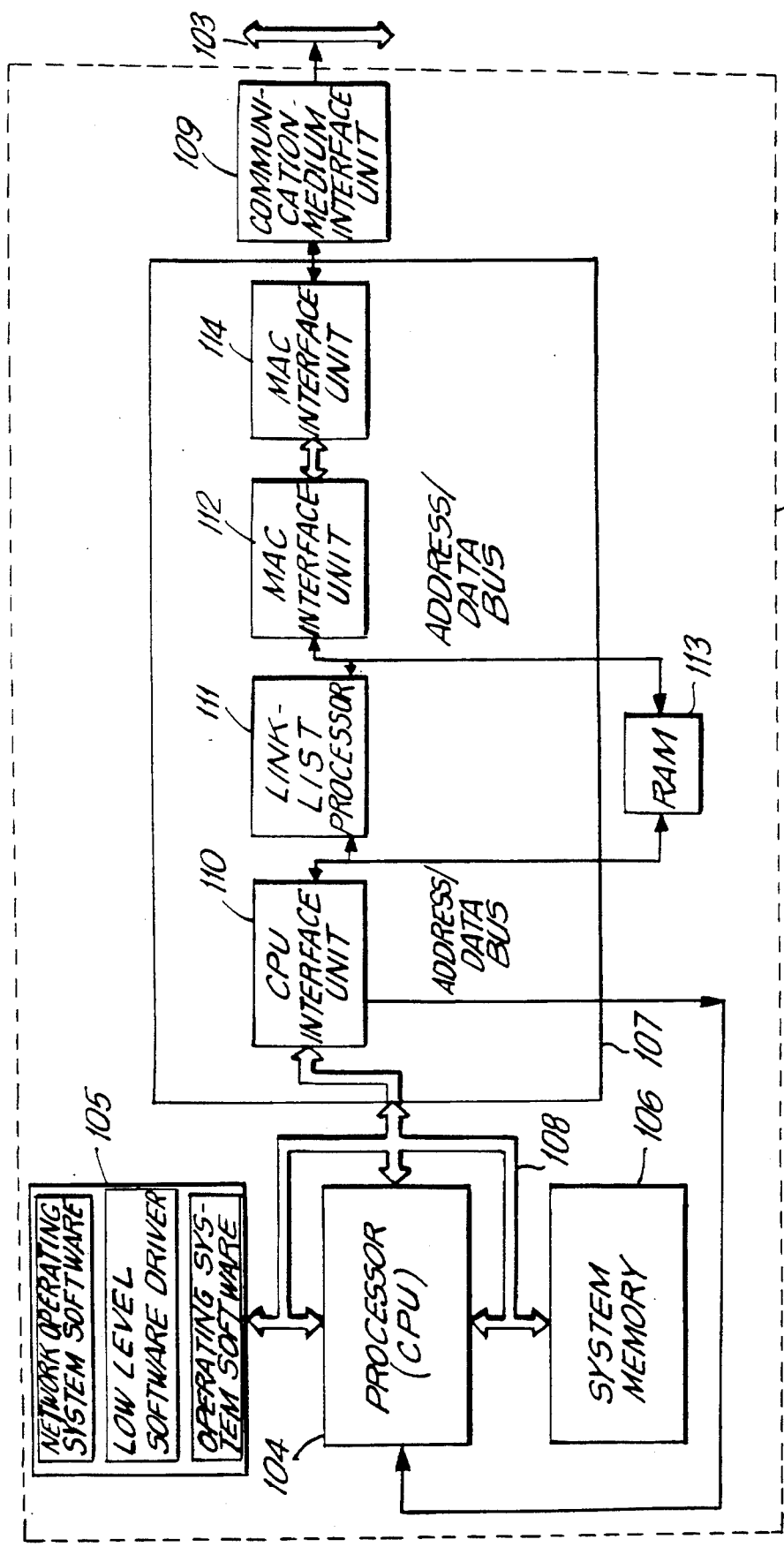
FIG. 3 is a block functional diagram of a prior art station illustrated in FIG. 2, showing functional subunits of a link-list communication controller incorporated therein.
Figure 4:
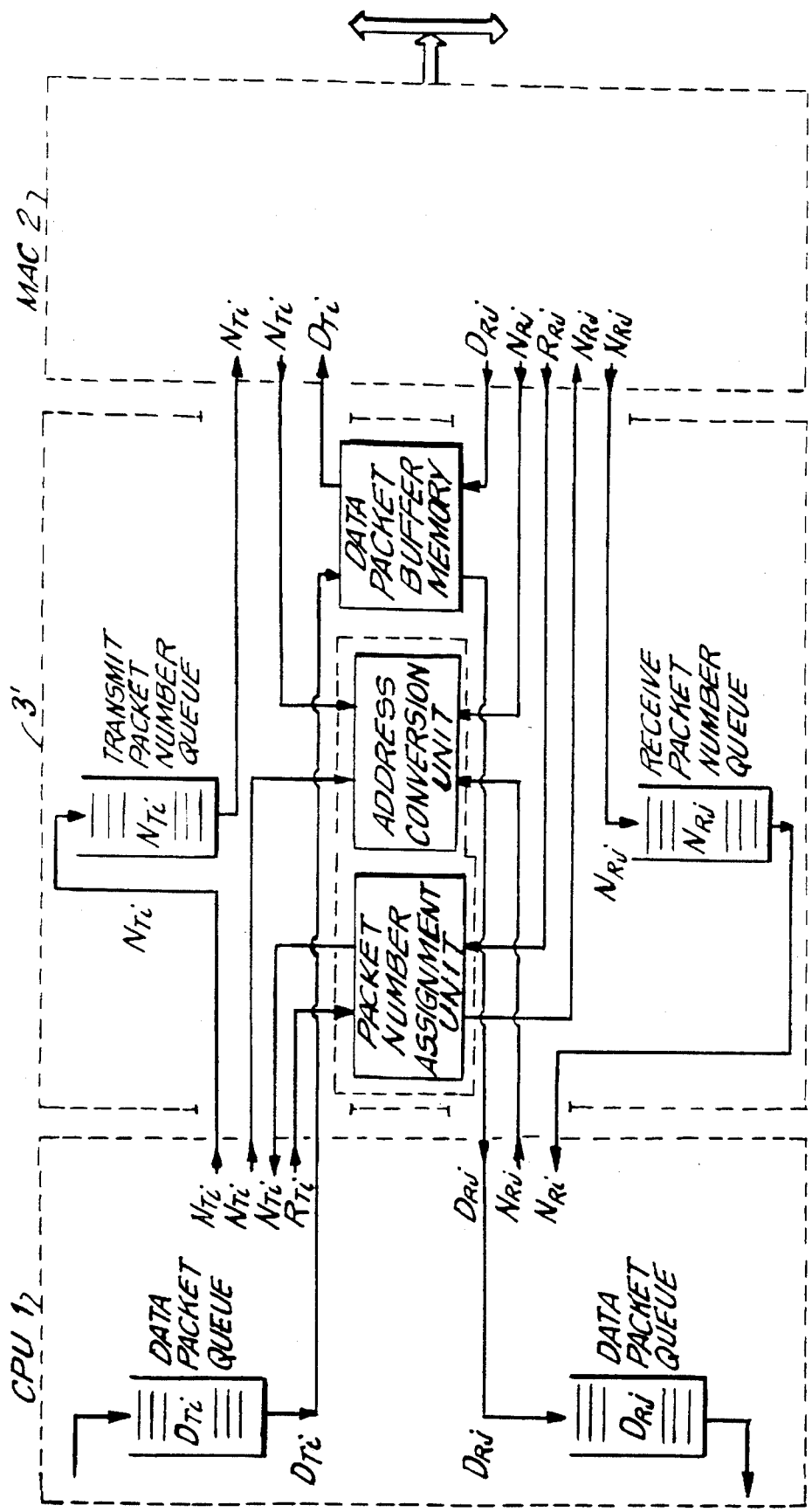
FIG. 4 is a high-level schematic representation of a communication controller constructed in accordance with the present invention, illustrating the basic parameters utilized by the host processor (i.e. CPU) and the medium access control unit during data-communication operations.

Referring to FIG. 4, the method and apparatus for buffering data packets in accordance with the present invention is schematically illustrated in connection with a host processor (i.e. CPU) 1 and the medium access control (MAC) unit 2 of a communication controller 3. As illustrated, transmit and receive data packet queues 4 and 5 are managed in the station's system memory by a software based low-level driver under the control of the host processor. While not represented, the medium access control unit typically comprises a microsequencer running a microprogram or state machine (i.e., an algorithm) which effectuates the network protocol and ultimately, the communication controller's access to the communication medium. To carry out the network protocol, each medium access control unit in each station communication controller must perform the same algorithm. Processor "interrupts" provided by the communication controller are the basic scheduling events upon which the low-level driver manages the flow of data packets between transmit and receive queues, and the communication controller.

As illustrated in FIG. 4, the communication controller of the present invention generally comprises data packet buffer memory 6 for queuing transmit and receive data packets; a buffer memory management unit (i.e. facility) 7 which as illustrated, includes an address conversion (i.e., mapping) unit 8; and transmit and receive packet number queues 9 and 10 for queuing packet numbers assigned to transmit and receive data packets, respectively. Address conversion unit 8 is operably associated with buffer memory 6 and in general accepts as input packet numbers $N_{Ti}$ and $N_{Rj}$ and produces a set of physical addresses defining available storage space (i.e. locations) within buffer memory 6.

On the host processor side, packet number transfer means 11 is provided for transferring packet numbers from the host processor to transmit packet number queue 9, as well as from the host processor to address conversion unit 8. Packet number transfer means 12 is also provided for transferring packet numbers from receive packet number queue 10 to the host processor, as well as from the host processor to address conversion unit 8.

On the medium access control unit side, packet number transfer means 13 is provided for transferring packet numbers from transmit packet number queue 9 to the medium access control unit, as well as from the medium access control unit to address conversion unit 8. Packet number transfer means 14 is also provided for transferring packet numbers from medium access control unit to address conversion unit 8, as well as from the medium access control unit to receive packet number queue 10. In order to transfer data packets between transmit packet queue 4 and buffer memory 6, and between buffer memory 6 and the medium access control unit, data packet transfer means 15 is also provided. Also, to transfer data packets between receive packet queue 5 and buffer memory 6, and between buffer memory 6 and the medium access control unit, data packet transfer means 16 is provided. Typically, data packet transfer means 15 and 16 are in the form of data buses, well known in the art.

In principle, memory management unit 7 determines which data storage locations are available in buffer memory and dynamically allocates an arbitrary yet sufficient number of those storage locations to an available packet number, so as to be able to store the corresponding data packet. The i-th transmit data packet $D_{Ti}$ in transmit queue 4 is stored in buffer memory 6 by issuing a packet number $N_{Ti}$ to the address conversion unit of the memory management unit. Address conversion unit 8 then generates a set of physical addresses $A_{Ti}'$ which provide access to corresponding storage locations which have been allocated in buffer memory. Upon generation of these physical addresses, the host processor copies transmit data packet $D_{Ti}$ from transmit queue 4 into the physical storage locations specified by the assigned packet number through the address conversion process. Then, packet number $N_{Ti}$ is inserted into transmit packet number queue 9 for subsequent use by the medium access control unit, during packet unloading operations.

While packet numbers corresponding to transmit data packets $D_{Ti}$ can be assigned by the host processor (and by the medium access control unit for receive data packets $D_{Rj}$), the memory management unit of the illustrated embodiment assigns all packet numbers. To achieve this function, the memory management unit further includes a packet number assignment unit 17 which accepts and decodes memory storage requests $R_{Ti}$ and $R_{Rj}$ from the host processor and medium access control unit, respectively. In response, the packet number assignment unit assigns a packet number to each corresponding data packet, for which a memory storage request has been made. In turn, packet numbers $N_{Ti}$ and $N_{Rj}$ are issued to the host processor and medium access control unit, respectively. In the illustrated embodiment, each packet number will be a unique number, digitally represented within the communication controller and host processor.

To transfer each memory storage request $R_{Ti}$ from the host processor to packet number assignment unit 17, request transfer means 18 is provided. To transfer each assigned packet number $N_{Ti}$ from packet number assignment unit 17 to the host processor, packet number transfer means 19 is provided. Similarly, to transfer each memory request $R_{Rj}$ from the medium access control unit to packet number assignment unit 17, request transfer means 20 is provided, whereas packet number transfer means 21 is provided for transferring each assigned packet number $N_{Rj}$ to the medium access control unit.

After loading a number of transmit data packets $D_{Ti}$ into buffer memory 6 in accordance with the above-described method, transmit packet number queue 9 will contain a number of packet numbers arranged in a sequential order, such that the first packet number inserted into the queue is the first one to be removed from the queue. Each transmit data packet $D_{Ti}$ corresponding to packet number $N_{Ti}$ in the transmit packet number queue, is stored in buffer memory 6 in a manner and location completely transparent to the host processor and the medium access control unit. The assigned packet numbers in the transmit packet number queue 4, retain all queue information relating to the transmit data packets stored in buffer memory 6.

The following process is carried out by the medium access control unit, in order to unload from buffer memory 6, the transmit data packet which corresponds to the packet number first to be removed from transmit packet number queue 4.

The medium access control unit first reads out the i-th data packet number $N_{Ti}$ from the removal location of transmit packet number queue 4. This retrieved packet number is then provided to address conversion unit 8 which generates physical addresses $A_{Ti}'$ that specify the physical storage locations in which the data bytes of the corresponding data packet $D_{Ti}$ are stored. From these accessed storage locations in buffer memory, the data bytes comprising the transmit data packet $D_{Ti}$ are read out by the medium access control unit and subsequently placed on the communication medium 103. After transmission of data packet $D_{Ti}$, the medium access control unit can write transmit status data into storage locations associated with the physical storage locations from which data packet $D_{Ti}$ was read out. After transmit status data is written into buffer memory 6, an interrupt to the host processor is generated. The host processor, maintaining a software queue of assigned packet numbers $N_{Ti}$, gains access to transmit status data in these physical storage locations, by selecting packet number $N_{Ti}$ from the removal location in the software queue. The selected packet number $N_{Ti}$ is then converted into the allocated physical addresses $A_{Ti}'$ by the address conversion unit. After transmit status data is read and utilized by the host processor, the host processor issues a release command $F(N_{Ti})$ to packet number assignment unit 7, in order to release the storage locations in buffer memory 6 that have been allocated to packet number $N_{Ti}$. In this way, these released storage locations will be free for future allocation to either transmit or receive data packets.

The communication controller of the present invention operates much in the same way for loading and unloading of receive data packets $D_{Rj}$. For example, the medium access control unit issues a request $R_{Rj}$ to the memory management unit for allocation of a number of storage locations in buffer memory 6, sufficient to store the j-th incoming receive data packet, $D_{Rj}$. In response to request $R_{Rj}$, a packet number $N_{Rj}$ is assigned to the j-th receive data packet, $D_{Rj}$ and then provided to the medium access control unit. The medium access control unit issues assigned packet number $N_{Rj}$ to the address conversion unit of the memory management unit, which generates a set of physical addresses $A_{Rj}$ that specify and provide access to storage locations in buffer memory 6, for storing receive data packet $D_{Rj}$ which corresponds to packet number $N_{Rj}$. With access to allocated storage locations within buffer memory 6, the j-th receive data packet $D_{Rj}$ is read from the medium access control unit into the allocated storage locations. After loading receive data packet $D_{Rj}$ into buffer memory, corresponding packet number $N_{Rj}$ is placed into the insertion location of receive packet number queue 10 of the communication controller. Receive status data concerning the receive data packet $D_{Rj}$, can be written into one or more of those storage locations which have been allocated to receive packet number $N_{Rj}$. The nature of such receive status data can relate to the integrity or the type of data packet just reviewed. Subsequently, an interrupt to the host processor will be generated indicating that unloading of a receive data packet can take place when desired by the host processor. Prior to the packet unloading operation, however, the host processor can read receive status data stored in buffer memory, in a manner similar to transmit status data storage and retrieval discussed above.

After loading a number of receive data packets $D_{Rj}$ into buffer memory 6 as described above, receive packet number queue 10 will contain a number of packet numbers, also arranged in a sequential order such that the first packet number into the queue is the first one to be removed from the queue. Also, each receive data packet $D_{Rj}$, corresponding to packet number $N_{Rj}$ in receive packet number queue 10, is stored in buffer memory 6 along with transmit data packets, and in a manner and location completely transparent to the medium access control unit and the host processor. As with the stored transmit data packets, the assigned packet numbers in receive packet number queue 10 retain all queue information relating to the receive data packets stored in buffer memory.

The following process is carried out by the host processor, in order to unload from buffer memory 6, the receive data packet which corresponds to the packet number first to be removed from transmit packet number queue 10.

The host processor first reads out the j-th data packet number $N_{Rj}$ from the removal location of receive packet number queue 10. This retrieved packet number $N_{Rj}$ is then provided to address conversion unit 8, which generates the physical addresses $A_{Rj}'$ that specify the physical storage locations, in which the data and status bytes of the corresponding data packet $D_{Rj}$ are stored. Upon generating an interrupt, receive status bytes are read out by the host processor from storage locations in buffer memory 6. After checking the integrity of the received data packet $D_{Rj}$ and transferring the receive data packet from buffer memory to receive data packet queue 5, the host processor issues a release command $F(N_{Rj})$ to packet number assignment unit 17 in order to release the storage locations in buffer memory 6 that have been allocated to packet number $N_{Rj}$. In this way, these released storage locations will be free for future allocation to transmit or receive data packets.

A significant feature of the present invention described above is that all during the loading and unloading operations of data packets, the physical storage locations in buffer memory 6 are transparent to both the host processor and the medium access control unit. The host processor and medium access control unit acquire necessary access to buffer memory 6 by providing a packet number to the memory management unit, and then transferring the corresponding data packet into or out of the buffer memory, as desired. Conversion of packet numbers into physical addresses and determination and allocation of free storage locations within buffer memory, occurs completely transparent to the host processor and the medium access control unit. Advantageously, this reduces substantially the overhead of the software-based low-level drivers, as well as the algorithm-based medium access control unit.

The above-described method and apparatus for buffering data packets within a communication controller has assumed that the host processor and medium access control unit are each capable of transferring, as complete elements, data packets ($D_{Ti}$ and $D_{Rj}$) to and from the buffer memory of the communication controller. Conventional host processors and as medium access control units are typically limited to transferring up to a few bytes of data at a time, over their respective data buses, and data packets $D_{Ti}$ and $D_{Rj}$ will typically comprise a number of data bytes. Consequently, depending on the length of the data packet, each data packets $D_{Ti}$ and $D_{Rj}$ will require a particular number of data-byte "transfer operations" in order to completely transfer a data packet between the host processor and the buffer memory, or between the medium access control unit and the buffer memory. This data transfer requirement has been satisfied by another aspect of the present invention, described hereinbelow.

In the first illustrated embodiment of the present invention, the packet length can vary between 64 to 1518 bytes per data packet and buffer memory 6 (e.g. RAM) is preferably divided into eighteen pages, each of which contains 256 bytes of storage locations. In such an embodiment, each storage location is of sufficient bit length to store a byte of data. In order to maintain physical storage locations transparent to the host processor and the medium access control unit while permitting data byte transfer, a windowing-type memory accessing technique is employed. In essence, this technique involves the host processor and medium access control unit either writing a packet of data bytes into or reading a packet of data bytes from an apparently fixed, linearly addressed window of storage locations in buffer memory 6. In actuality, however, such data bytes are written into or read from other physical storage locations that have been preallocated to the corresponding packet number by the memory management unit of the communication controller. In order to clearly illustrate this feature of the present invention, reference is made to FIGS. 5 and 5A, in particular.

Figure 5:
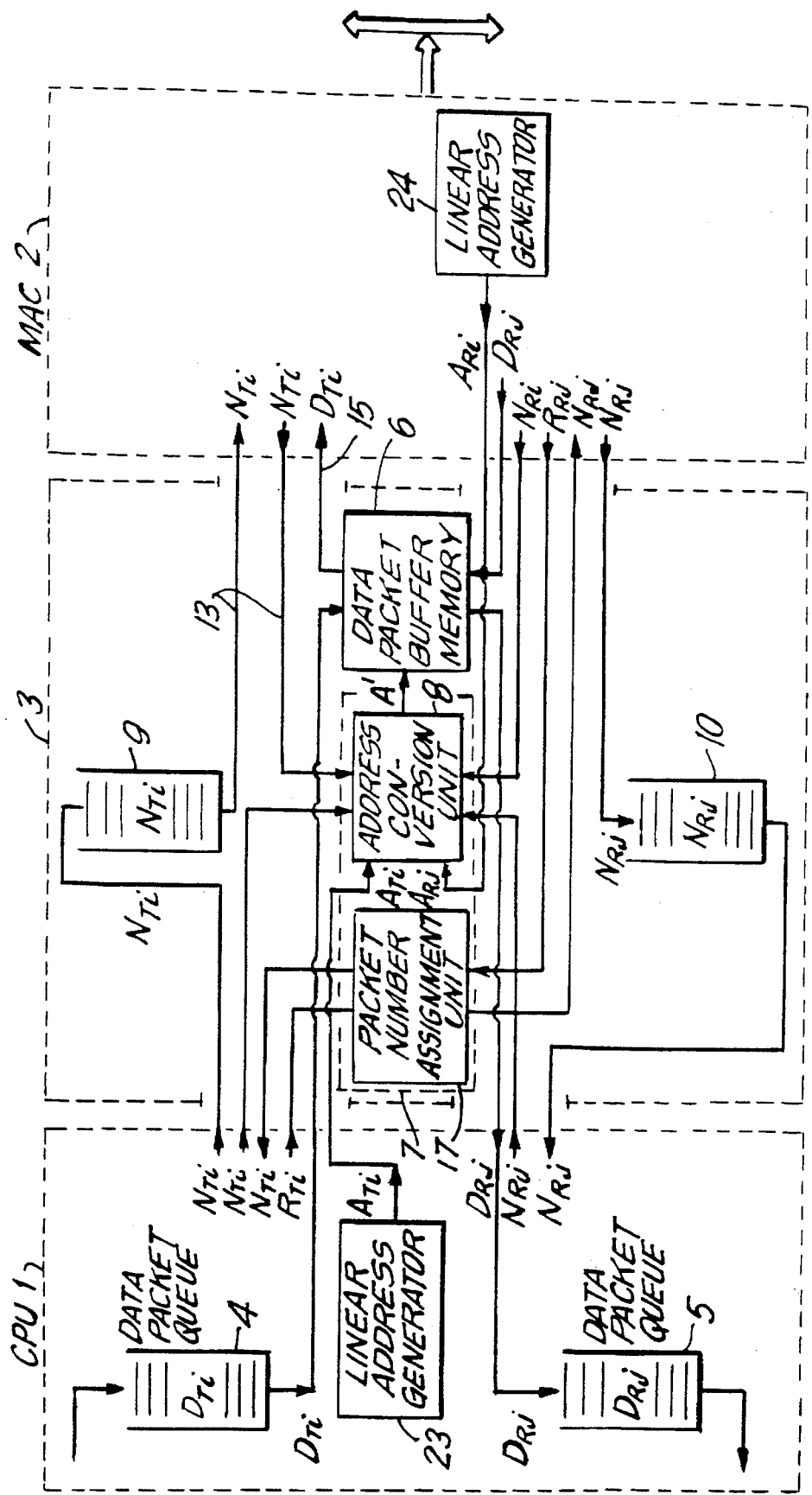
FIG. 5 is a high-level schematic representation of the communication controller illustrated in FIG. 4, with the addition of linear address generation capabilities at the sides of the host processor and the medium access control unit, in order to facilitate sequential data-byte transfer in the preferred embodiment of the present invention.
Figure 5A:
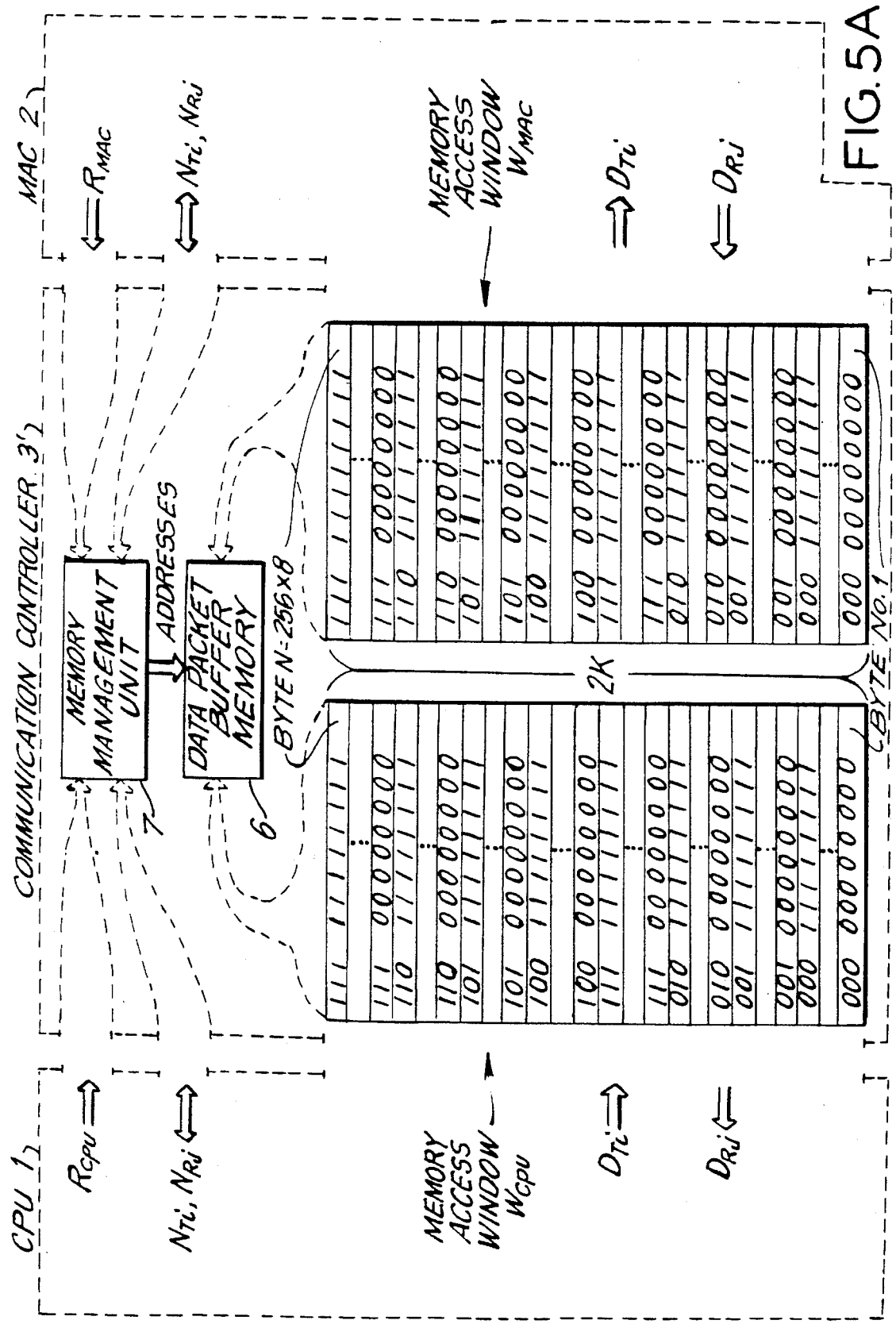
FIG. 5A is a high-level schematic representative of the communication controller of the present invention, which as seen by the host processor and the medium access control unit, has a memory access window for transfer of data packets having up to a maximum number of data bytes, the addresses of which are linearly ordered as shown.

In FIG. 5, a communication controller 3 similar to that illustrated shown in FIG. 4, is shown interfaced between host processor 1 and medium access control unit 2. In FIG. 5A, communication controller 3 according to the present invention is schematically illustrated to emphasize that the fact that the buffer memory is seen by both the host processor and the medium access control unit as a pair of transmit and receive memory storage areas or memory access windows, $W_{cpu}$ and $W_{MAC}$, each of which appear fixed in terms of address specification, and provide a "window" of access to the buffer memory. Specifically, memory access windows $W_{CPU}$ and $W_{MAC}$ are each defined by a fixed set of linear addresses ranging from a minimum value to a maximum value, with each consecutive address value being separated by a fixed address increment. In the illustrated embodiment, this 11-bit linear address range extends from {00000000000} to {11111111111} specifying a maximum range of eight pages (e.g. 2 kilobyte range) of storage locations in the buffer memory, with each page containing 256 bytes of storage location. As illustrated in FIG. 5A, memory access windows $W_{CPU}$ and $W_{MAC}$ are generated by linear address generators 23 and 24 at the host processor and medium access control unit, respectively. These linear address generators perform according to the above-described specifications and generate linear addresses which, in essence, define the length of the data packet and the relative location of each byte within it.

Memory access window $W_{CPU}$ serves two principal functions, namely: it provides the host processor random access to the bytes of storage locations within pages of buffer memory 6 in order to (i) store transmit packet $D_{Ti}$ and (ii) retrieve each receive packet $D_{Rj}$, without concern for the physical location of each allocated page in buffer memory. Memory access window $W_{MAC}$ serves two similar functions, namely: it provides the medium access control unit random access to the bytes of storage locations within pages of buffer memory in order to (i) retrieve each transmit data packet $D_{Ti}$ and (ii) store each receive data packet $D_{Rj}$, also without concern for the physical location of each allocated page in buffer memory. According to this embodiment of the present invention, each assigned packet number $N_{Ti}$ or $N_{Rj}$ in combination with the set of linear addresses $A_{Ti}$ or $A_{Rj}$ are provided to the address conversion unit of the communication controller, and together are used to convert the fixed linear addresses $A_{Ti}$ and $A_{Rj}$ into physical addresses $A_{Ti}'$ and $A_{Rj}'$ respectively, defined within buffer memory 6. In this way, while the host processor is simply writing the bytes of a data packet into a linearly arranged set of storage location within memory access window $W_{CPU}$, such data bytes are actually being mapped into a dynamically allocated page(s) of storage locations that have been arbitrarily allocated within buffer memory 6, while being shared amongst transmit and receive data packets alike.

Figure 6:
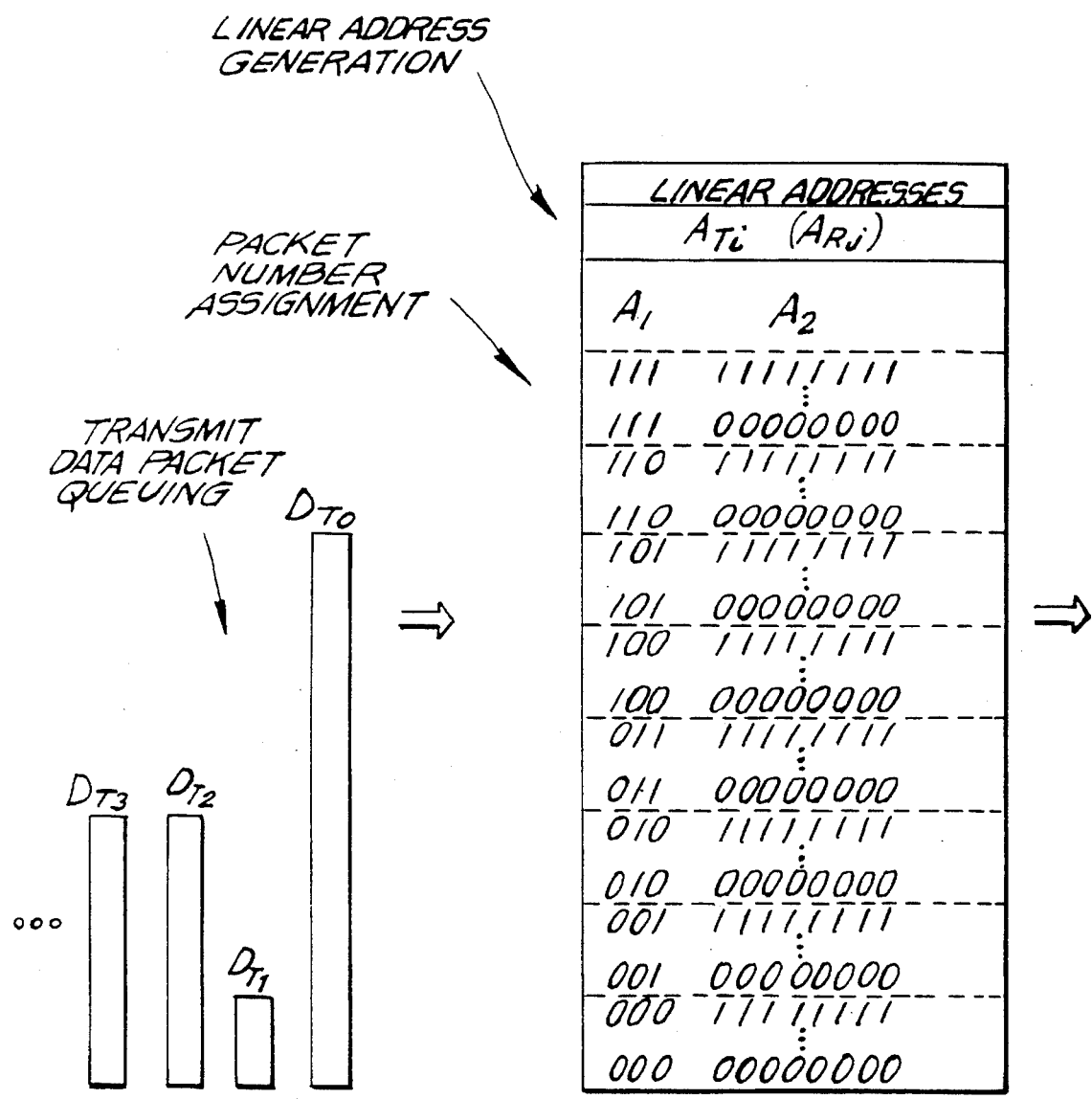
FIGS. 6 and 6A, taken together, provides a schematic representation of a data buffering method according to a first embodiment of the present invention, illustrating data packet queueing in system memory, packet number assignment, linear address generation for data packets to be transferred to data packet buffer memory, and linear-to-physical address conversion for storage of the data packets.
Figure 6A:
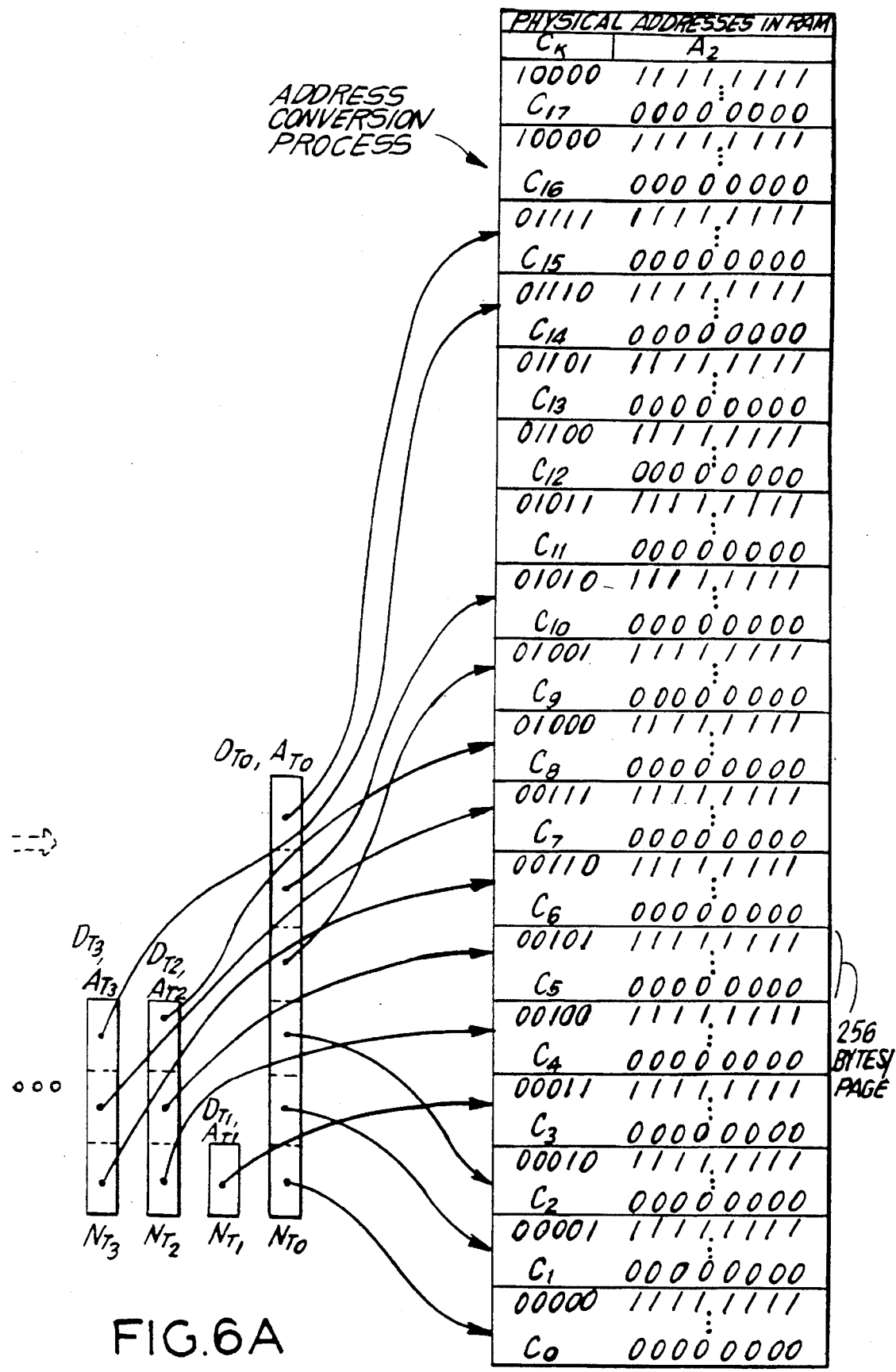

Referring now to FIGS. 6 and 6', the process of accessing buffer memory 6 through the memory access window $W_{CPU}$, is illustrated in connection with storing transmit data packets into one or more pages of the buffer memory. As illustrated in FIG. 6, four transmit packets $D_{T0}$ through $D_{T3}$ are queued up in the transmit data packet queue 4 ready to be stored in buffer memory 6. One data packet at a time is assigned a unique packet number $N_{ti}$ and then given a set of linear addresses, represented as $A_{Ti}$ for transmit data packet $D_{Ti}$. As understood, the length of each data packet $D_{Ti}$ is proportional to the number of bytes contained in the data packet, and the more bytes contained within the data packet implies that a greater range of linear addresses $A_{Ti}$ will be required to write data packet $D_{Ti}$ into data packet window $W_{cpu}$, defined above. For illustrative purposes only, transmit data packet $D_{T0}$ contains six pages of data bytes. Thus, the range of linear addresses which need to be generated to write this memory access into data packet window $W_{cpu}$, begins at {000 00000000} and terminates at about {101 11111111} as shown. On the other hand, data packets $D_{T3}$ and $D_{T4}$ each contain about two and one-half pages of data bytes, and thus the range of linear addresses which need to be generated to write each data packet into memory access window $W_{cpu}$, begins at {000 00000000} and terminates at about {010 00111111} as shown.

In the illustrative embodiment of FIGS. 6 and 6', each set of linear addresses for a transmit data packet $D_{Ti}$ is represented as $A_{Ti}$, and as indicated, has two components, namely: a first address component $A_1$ comprising the first three most significant bits (MSB) of $A_{Ti}$, and a second address component $A_2$ comprising the eight least significant bits (LSB) of $A_{Ti}$. As will be explained in greater detail hereinafter, within the memory management unit of the first illustrated embodiment, address component $A_1$ represents the page (e.g. first, second, third, etc.) of the data packet to which the data byte belongs, whereas address component $A_2$ represents the byte address within that particular page (i.e. offset). Similarly, each set of linear addresses for each receive data packet $D_{Rj}$ is represented as $A_{Rj}$, and like $A_{Ti}$, has two components: namely a first address component $A_1$ comprising the first three most significant bits of $A_{Rj}$, and a second address component $A_2$ comprising the eight least significant bits of $A_{Rj}$. In the illustrated embodiment discussed above, address components $A_1$ and $A_2$ represent similar features defined within the memory management unit of the particular embodiment. Notably however, with respect to linear address generators 23 and 24, page distinctions of any sort are neither made nor recognized. Only within the memory management unit are there page differentiations.

As illustrated in FIGS. 6 and 6', each data packet undergoes packet number assignment prior to generation of the linear addresses. As discussed hereinabove, this involves the host processor placing a Request $R_{Ti}$ to the memory management unit, and in return, a packet number $N_{Ti}$ is assigned to the data packet $D_{Ti}$, to which one or more pages of data byte storage locations have been dynamically allocated in buffer memory 6. This dynamic allocation process will be described in greater detail below in connection with specific illustrated embodiments of the communication controller according to the present invention. Assigned packet number $N_{Ti}$ and the set of linear addresses $A_{Ti}$ for data packet $D_{Ti}$, are then utilized by the memory management unit to produce a set of physical addresses $A_{Ti}'$ within buffer memory 6, that are sufficient to store the bytes of the data packet. Notably, owing to the dynamic memory feature of the present invention, each page of data bytes within the data packet need not and will not be stored in contiguous page storage locations, as illustrated in FIGS. 6 and 6'.

Two important points should be made at this juncture regarding the present invention. First, the linear-to-physical address conversion process within the memory management unit is completely transparent to both the host processor and the medium access control unit. Consequently, neither the host processor or the medium access control unit know just where any data packet may be stored in buffer memory; all that the host processor and medium access control unit have is a packet number assigned to a corresponding data packet stored somewhere in buffer memory 6. Secondly, the host processor and the medium access control unit are each capable of (i) accessing the packet numbers from the transmit and receive packet number queues 9 and 10, and (ii) writing into and reading from fixed memory access windows ($W_{cpu}$ and $W_{mac}$) defined by a delimited range of linear addresses. Consequently, buffer memory 6 is seen by the host processor and medium access control unit as a set of independent memory areas consisting of contiguous byte storage locations, having a length equal to the memory access windows $W_{cpu}$ and $W_{mac}$, e.g. 2 kilobytes.

Figure 7:
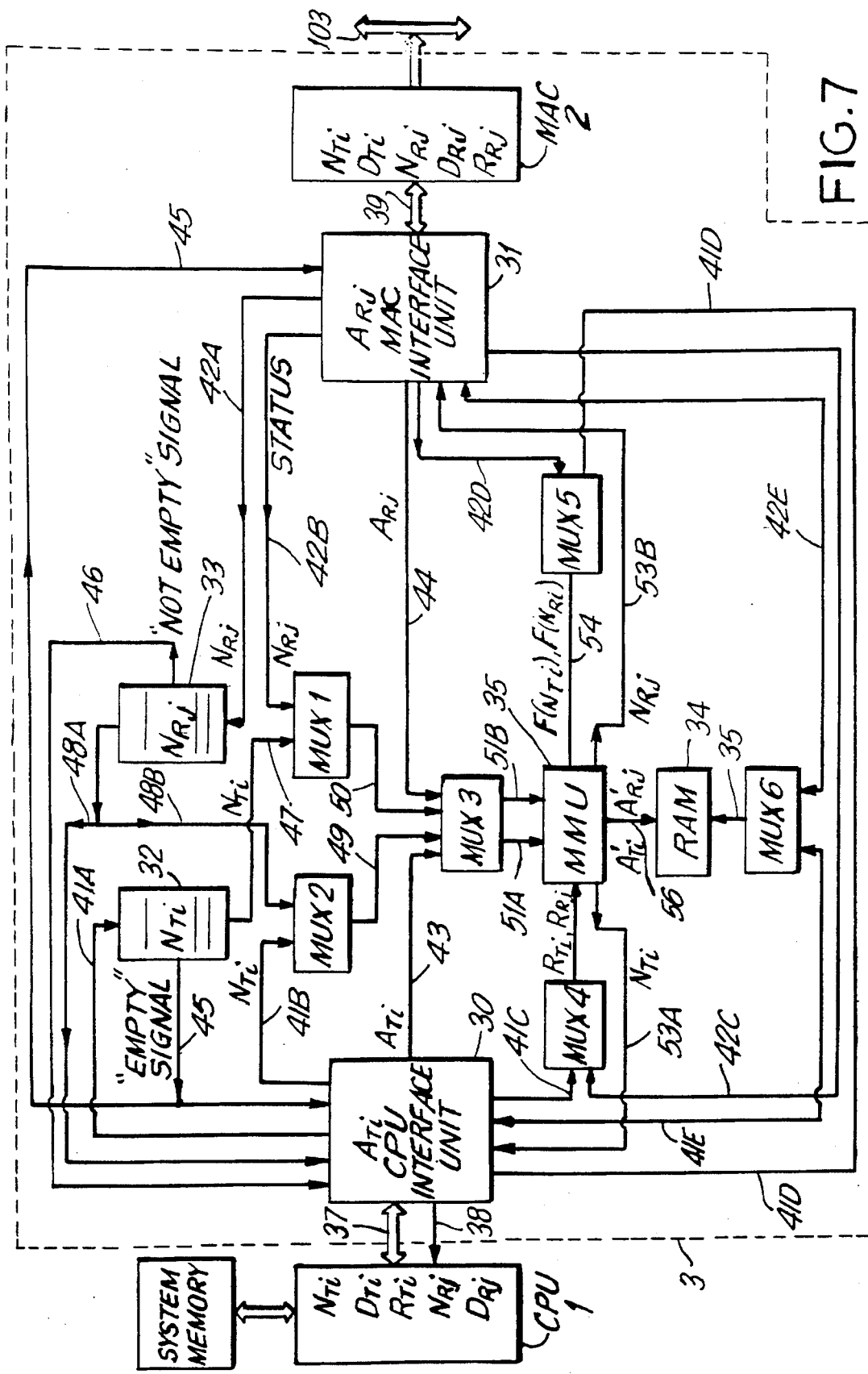
FIG. 7 is a block functional diagram of the communication controller according to the first embodiment of the present invention, showing its subcomponents integrated together and interfaced between the host processor and the medium access control unit.

Referring to FIG. 7, a lower-level representation of the communication controller of the first embodiment of the present invention, is presented. As shown, communication controller 3' comprises a central processing unit (CPU) interface unit 30, a medium access control (MAC) interface unit 31, medium access control unit 2, transmit packet number queue 32, a receive packet number queue 33, data packet buffer memory 34, six switching devices $M_1$ through $M_6$ in the form of multiplexers, and memory management unit 35. In the illustrated embodiments, only data and address lines are shown, with control lines removed in order to avoid obfuscation of the present invention. Also, in the illustrated embodiments, Carrier Sense Multiple Access with Collision Detection (CSMA/CD) has been selected as the network protocol for medium access control unit 2. As will become apparent hereinafter, there are several differences between the first and second illustrated embodiments. For example, in the first illustrated embodiment of FIGS. 7 through 7C, all the above-identified components would be implemented as digital circuits integrated on a single chip using known IC manufacturing techniques. In a second embodiment illustrated in FIGS. 10 through 10C, all components except for the buffer memory would be realized on a single chip, with input and output ports provided for an externally interfaced (i.e. off chip) buffer memory. Other important differences with respect to buffer memory storage, will be described hereinafter. Nevertheless, it is understood that principle of the invention disclosed in this first embodiment but not in the second embodiment and vice versa, can be combined in a variety of manners to provide additional embodiments, all of which are embraced by the spirit of the present invention.

In FIG. 7, CPU interface unit 30 generally comprises logic circuitry suitable for interfacing the address, data and control lines of system bus 37 with buffer memory 34, memory management unit 35, and transmit and receive packet number queues 32 and 33, involving multiplexers $M_2$, $M_3$, $M_4$, and $M_6$, as shown. While not shown, CPU interface unit 30 also includes a transmit interrupt storage register, a receive interrupt storage register, an MMU interrupt storage register and an interrupt generating circuit. Each storage register is adopted to store an interrupt code. The output of each storage register is read by the interrupt generating circuit and depending on the content of what is read, it generates a respective interrupt which is provided to the host processor over a designated line 38. As will be described in greater detail hereinafter, interrupt codes for transmit and receive interrupt storage registers are provided from transmit and receive packet number queues 32 and 33, respectively. The interrupt code for the MMU interrupt storage register is provided by memory management unit 35. The interrupt generating circuit is adapted to generate each respective interrupt to the host processor under a particular condition. The first condition is for generating a receive interrupt and occurs after the medium access control unit has written receive status bytes into buffer memory 34 after a data packet reception. The second condition is for generating transmit interrupt and occurs after medium access control unit has transmitted one or more transmit data packets, and it might be time to store more transmit data packets in buffer memory. The third condition is for generating an MMU interrupt and occurs after a requested free page becomes available in buffer memory 6 and a packet number is assigned to a transmit data packet. When the low-level driver executed by the host processor, receives an interrupt, it will instruct the host processor to determine the source of the interrupt. The interrupt generating mechanism will be described in yet greater detail hereinafter.

Preferably, buffer memory 34 comprises a randomly-accessible memory (RAM) storage device which has a plurality of data byte storage locations. In the first illustrated embodiment, with on-chip random access buffer memory, the total memory size could be, for example, 4608 bytes. With each page of memory having 256 bytes storage capacity, a memory of 4608 bytes provides 18 pages. In the illustrated embodiment, this requires an additional 144 5-bit storage locations for realizing the "address conversion table" of FIG. 7A, and 18 6-bit storage locations for realizing "packet number and memory page allocation" table of FIG. 7C. Both of these tables will be described in greater detail hereinafter.

Figure 8A:
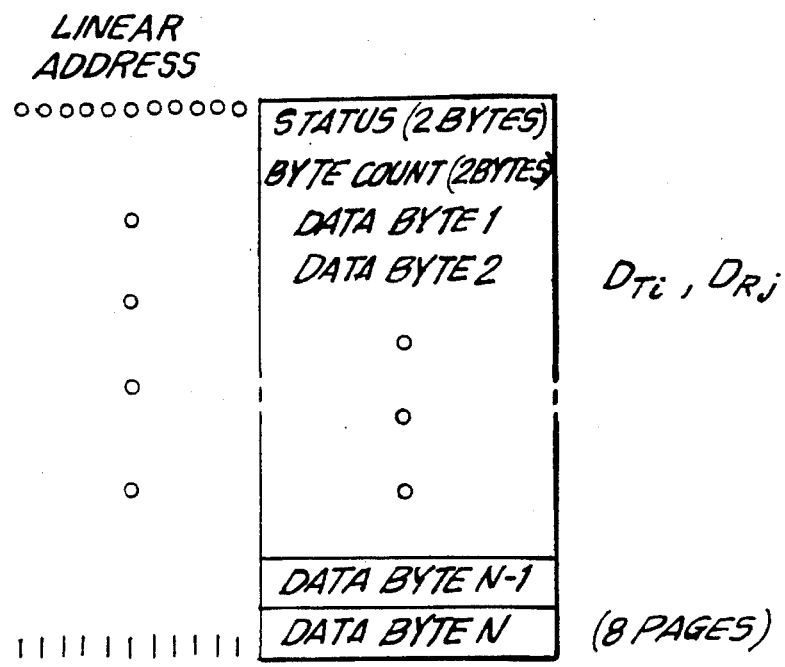
FIG. 8A is a schematic representation of the data packet storage format employed in the data packet buffer memory of the communication controller of the illustrated embodiment.

Referring to FIG. 8a, the storage format of a data packet $D_{Ti}$ or $D_{Rj}$ in buffer memory 34, is illustrated. As specified by linear addresses ranging from {00000000000} to {11111111111}, a data packet may contain up to eight pages of data bytes for storage in buffer memory 34. According to the storage format illustrated in FIG. 8A, the first two data byte storage locations are designated for transmit or receive status bytes. The next two-byte storage locations are designated for the data-byte count of the packet. All successive byte storage locations are designated for storage of data bytes of the data packet. In the illustrated embodiments, this data count can range from 64 to 1518 bytes.

As hereinbefore described, the medium access control unit of the illustrated embodiments includes a state machine which performs all of the control operations necessary to carry out the CSMA/CD protocol. On the one hand, the medium access control unit is interfaced with communication medium whereas, on the other hand, the medium access control unit is interfaced with the MAC interface unit 31, as shown.

MAC interface unit 31 generally comprises logical circuitry suitable for interfacing the address, data and control lines of MAC bus 39 with buffer memory 34, memory management unit 35, and transmit and receive packet number queues 32 and 33, involving multiplexers $M_1$, $M_3$, $M_5$, and $M_6$, as shown MAC interface unit 31 also includes a data packet storage register (not shown) in communication with data bus lines 39.

In the illustrated embodiment, transmit and receive packet number queues 32 and 33 are realized by first and second first-in-first-out (FIFO) storage units, respectively. Each FIFO storage unit 32 and 33 has a plurality of packet number storage locations, which in the illustrated embodiments, is of depth eighteen. Notably, however, in other embodiments the depth of these units may be greater or less than eighteen depending on the particular application. In the first embodiment, the length of each storage location is of bit length five, which is sufficient to digitally represent a range of eighteen packet number, corresponding with the eighteen total pages of memory in buffer memory 34.

While not shown in FIG. 7, data lines from system bus 37 extend through CPU interface unit 30 and emerge therefrom as lines 41A, 41B, 41C, 41D, 41E which connect respectively, to the data input of first FIFO storage unit 32, a first input of multiplexer $M_2$, a first input of multiplexer $M_4$, a first input of multiplexer $M_5$, and a first multiplexer $M_6$. Similarly, data lines from MAC bus 39 extend through MAC interface unit 31 and emerge therefrom as lines 42A, 42B, 42C, 42D and 42E to connect respectively, to the data input of second FIFO storage unit 33, a first input of multiplexer $M_1$, a second input of multiplexer $M_4$, a second input of multiplexer $M_5$, and a second input of multiplexer $M_6$. While not shown, at first linear address generator is contained within CPU interface unit 30, and a second linear address generator is contained with MAC interface unit 31. In order to operably associate the first linear address generator with memory management unit 35, eleven-bit address lines 43 from CPU interface unit 30 connect to a first input of multiplexer $M_3$. Similarly, in order to operably associate the second linear generator linear generator with memory management unit 35, eleven-bit address lines 44 extend from MAC interface 31 and connect to a second input of multiplexer $M_3$. While not shown, control lines from a conventional arbitrator circuit (not shown) to connect to control inputs of multiplexers $M_3$, $M_4$, $M_5$, and $M_6$ in a manner well known in the art. Similarly, while not shown, multiplexer $M_1$ is controlled by the medium access control unit, whereas multiplexer $M_2$ is controlled by the CPU interface unit.

As seen by the host processor (CPU), each storage location in first FIFO unit storage unit 32 resides logically at the same address in the communication controller. Similarly, as seen by the medium access control unit, each storage location in second FIFO storage unit 33 resides logically at the same address in the communication controller. In general, the storage locations of FIFO storage unit 32 includes a first insert storage location into which each packet number $N_{Ti}$ can be written, and a first removal storage location from which each packet number $N_{Ti}$ can be read. In practice, the insert and removal locations are indicated by the pointers of the addressing system used in implementing FIFO storage device 32. The first insert storage location is advanced by the host processor writing a packet number into FIFO storage unit 32. On the other hand, the first removal storage location is advanced by the medium access control unit reading a packet number from FIFO storage unit 32. Constructed as such, a packet number can be written into the insert storage location of FIFO storage unit 32 by the host processor, and a packet number stored in FIFO storage unit 32 can be selectively read therefrom by the medium access control unit. FIFO storage unit 32 also has a port which provides an "empty" signal when the FIFO storage unit contains no packet numbers. As illustrated, this "empty" signal is transmitted by way of line 45 to both the transmit interrupt storage register in CPU interface unit 30 and to MAC interface unit 31.

Similarly, the storage locations of second FIFO storage unit 33 include a second insert storage location, into which each packet number $N_{Rj}$ can be written, and a second removal storage location from which each such packet number can be read. Insert and removal locations of FIFO storage unit 33 would also be indicated by the pointers of the addressing system, as discussed above. The second insert storage location is advanced by the medium access control unit writing a packet number $N_{Rj}$ into FIFO storage unit 33. The second removal storage location is advanced by the host processor reading a packet number from FIFO storage unit 33. Constructed as such, a packet number can be written into the storage location of FIFO storage unit by the medium access control unit, and a packet number stored in the removal storage location an be selectively read therefrom by the host processor. Similar to FIFO storage unit 32, FIFO storage unit 33 also has a port which provides a "not empty" signal when the FIFO storage unit contains one or more packet by way of line 46, numbers. As illustrated, this "not empty" signal is transmitted to the receive interrupt storage register contained within CPU interface unit 30.

As illustrated in FIG. 7, the output of first FIFO storage unit 32 is provided to a second input of multiplexer $M_1$ by way of line 47, whereas the output of the second FIFO storage unit 33 is provided to both the CPU interface unit and an input of multiplexer $M_2$ by way of lines 48A and 48B, respectively. The outputs of multiplexers $M_1$ and $M_2$, in turn, are provided to first and second inputs of multiplexer $M_3$ by way of lines 49 and 50, whereas eleven bit address lines 43 and 44 from CPU interface unit 30 and MAC interface unit 31, respectively, are provided to inputs of multiplexer $M_3$. By way of lines 51A and 51B, the two outputs of multiplexer $M_3$ are provided to two inputs of the memory management unit, which as indicated, have been designated for addresses $A_{Ti}$ or $A_{Rj}$ and packet numbers $N_{Ti}$ or $N_{Rj}$.

In order to selectively transmit Requests $R_{Ti}$ and $R_{Rj}$ to the memory management unit, data line 52 is provided between the output of multiplexer $M_4$ and the request input port of memory management unit 35. In order to issue assigned packet numbers $N_{Ti}$ and $N_{Rj}$ from the memory management unit to the host processor and medium access control unit, respectively, data lines 53A and 53B are provided, as shown. To selectively transmit page releases $F(N_{Ti})$ and $F(N_{Rj})$ to the memory management unit, data line 54 is provided between the output of multiplexer and in the release input port of the memory management unit.

In order to provide the host processor and the medium access control unit selective access to single-port buffer memory 34, the output of multiplexer $M_6$ is connected to the data port of buffer memory 34 by way of lines 55. Physical output from the memory management unit is provided to the address input port of buffer memory 34, by way of lines 56 as shown.

With the above-described arrangement, host processor can transfer packet numbers $N_{Ti}$ and $N_{Rj}$ to memory management unit 35 through selective control of multiplexers $M_2$ and $M_3$. The medium access control unit can transfer packet numbers $N_{Ti}$ and $N_{Rj}$ to memory management unit 35, through selective control of multiplexer $M_1$ and $M_3$. Transfer of linear addresses to windows $W_{cpu}$ and $W_{mac}$ are achieved through selective control of $M_3$.

Figure 7A:
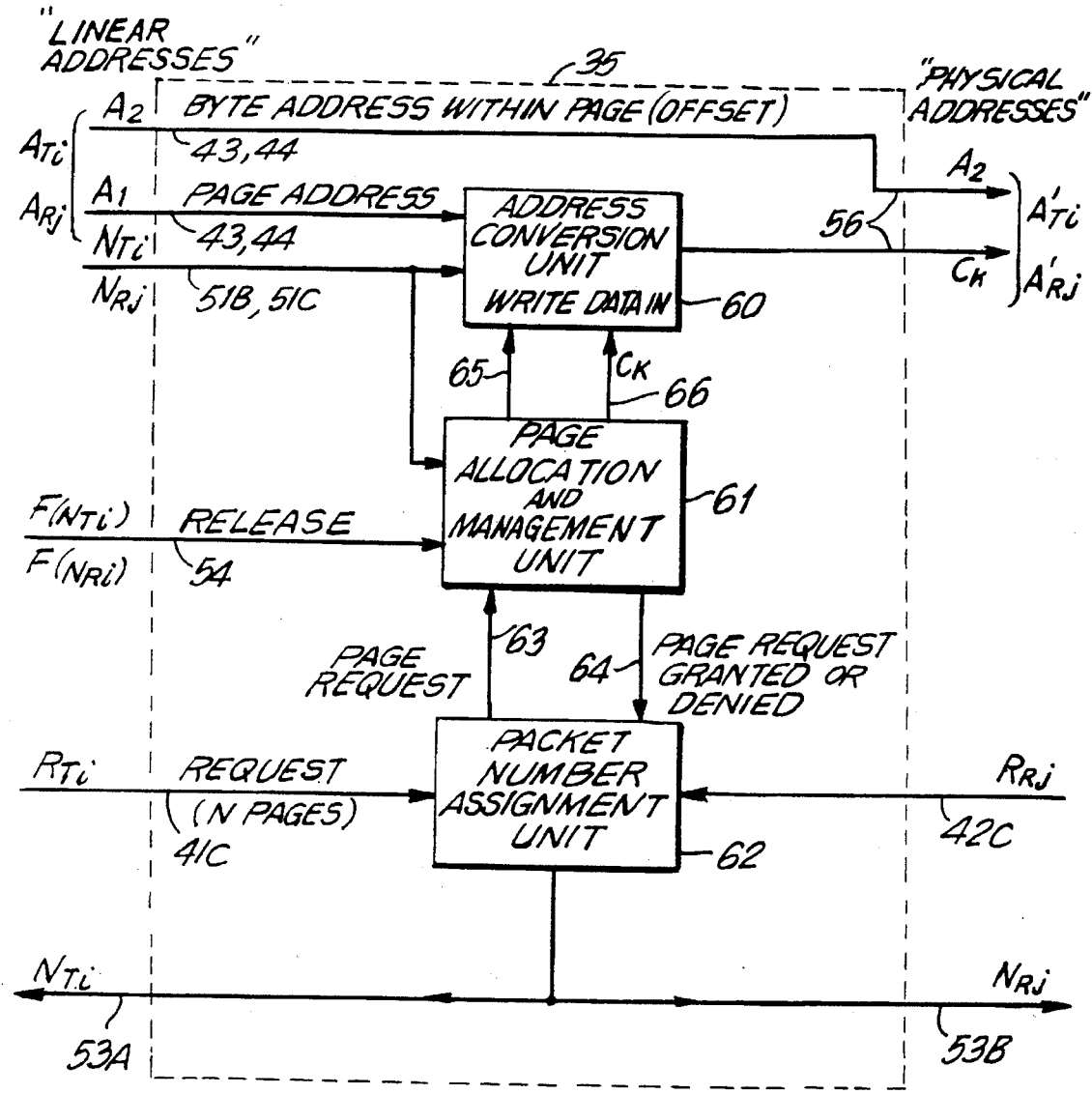
FIG. 7A is a block functional diagram of the memory management unit of the communication controller of FIG. 7.

Referring to FIGS. 7A, 7B and 7C, the various functional subcomponents of the memory management unit of the first embodiment of the present invention, will now be described.

As illustrated in FIG. 7A, memory management unit 35 of the first embodiment comprises address conversion unit 60, page allocation and management unit 61, and packet number assignment unit 62. The function and operation of the memory management unit and its functional subcomponents identified above, are best understood in terms of what the host processor and the medium access control unit are required to do during data packet storage within any particular embodiment of the present invention.

In general, to store a data packet in buffer memory 34, a request for storage space, $R_{Ti}$ or $R_{Rj}$, must be made. Each such request (i) specifies how many (M) pages of data byte storage locations are required to store the data packet, and (ii) solicits a unique packet number, to which M free (i.e., vacant) pages of buffer memory will be allocated. When the request has been satisfied, the assigned packet number $N_{Ti}$ or $N_{Rj}$ can be obtained from bus lines 53A, 53B. In the illustrated embodiment, satisfaction of a memory storage request requires the cooperative involvement of page allocation unit 61 and packet number assignment unit 62 in order to carry out several critical functions.

In particular, page allocation and management unit 61 stores information relating to free (i.e., vacant) pages in buffer memory 34, and is capable of updating this information upon the presence of a Release (i.e. $F(N_{Ti})$, $F(N_{Rj})$ or storage space Request $R_{Ti}$, $R_{Rj}$). This page allocation information can be stored in a table of the type shown in FIG. 7C. As discussed hereinabove, the buffer memory of the first illustrated embodiment has eighteen pages of 256 data byte storage locations. Thus, each page in buffer memory is represented in the first row of the table by $C_K$, which ranges from 0 to 17 as shown. While values of $C_K$ are shown in base-ten notation, these page numbers are in actuality represented as five bit digital numbers, for reasons which will become apparent hereinafter.

In the second row of the table of FIG. 7C the page status is indicated below the page number. For example, if page $C_K$ is occupied, then there is no packet number present in the table entry location associated with it. On the other hand, and if page $C_K$ is free, or not occupied, then a free-marker or flag "F" is placed therein, as shown for pages 11, 12 and 13. In the third row, the data packet which occupies a particular page is indicated by placing its packet number in its table entry location. For example, since data packet $D_{T0}$ has been allocated six pages, i.e., 0, 1, 2, 9, 10 and 15 in buffer memory, packet number $N_{Ti}=0$ is written in each column of pages 0, 1, 2, 9, 10 and 15 as shown. In this way, by simply referring to this table, it is possible to quickly determine (i) what pages in buffer memory are free and (ii) what data packet (identified by its packet number) has been allocated to any particular memory page. Using this table it is also possible to release those pages of buffer memory which have been allocated to a particular packet number. All that is required is to search the third row for a particular packet number (e.g. $N_{Ti}=0$) and delete each occurrence of this packet number and insert the free-marker "F" in the second row above each deleted packet number.

When a request $R_{Ti}$ from the host processor for M free pages appears at packet number assignment unit 62, a sequence of operations occur. First, a "page request" signal is generated by packet number assignment unit 62 and transmitted to page allocation and management unit 61 over line 63. In response to the page request signal, the second row of the table of FIG. 7C is searched to determine if there is a free page available for allocation to an available packet number. If there is a free page available at the time of the page request signal, then the available packet number is assigned to the data packet $D_{Ti}$ and then it is written into the third row of the table below the free page. Then, page allocation and management unit 61 transmits to packet number assignment unit 62 over line 64, a "page request granted" signal, and upon the receipt thereof, packet number assignment unit 62 counts a page as having been allocated to the assigned packet number. This page allocation process is carried out sequentially for each page request, that is, by allocating a single free page at a time through granting of page requests, until M free pages have been allocated. After each free page allocation, the assigned packet number is written into the third row of the table, under the allocated free page. Upon completion of M sequential page allocations to the assigned packet number, packet number assignment unit 62 then places the assigned packet number $N_{Ti}$ onto data bus lines 53A. This "valid" packet number is transmitted to CPU interface unit 30 where it is stored in the MMU interrupt storage register, which can be read by the host processor.

If, however, it is determined after any number of sequential searches through the table of FIG. 7C, that there are not M free pages available in buffer memory at the present time, then a "page request denied" signal will be generated by page allocation and management unit 61 and transmitted to packet number assignment unit 62. In response, packet number assignment unit 62 places and "invalid" packet number onto data lines 53A. This invalid packet number is transmitted to CPU interface unit 30 where it is stored in the MMU interrupt storage register. As discussed hereinabove, this register is read by the interrupt generating circuit, which, in response, will generate an MMU interrupt to the host processor. Then, upon reading this five-bit MMU interrupt storage register, the host processor will determine that its request $R_{Ti}$ has not been granted. Since, however, the host processor has ample buffering capabilities for storing transmit data packets, the page allocation and management unit 61 will continue to sequentially search the second row (i.e., page status row) of the table of FIG. 7C, and will allocate the required number of free pages, one by one, as they become released. After each additional free page has been allocated, a "page request granted" signal is generated and transmitted to packet number assignment unit 62. When packet number assignment unit 62 has counted M number of free pages as having been allocated to the assigned packet number, packet number assignment unit 62 will place the assigned (valid) packet number onto data bus lines 53A. The assigned packet number is then transmitted to CPU interface unit 30 and stored in the MMU interrupt register. As described above, the interrupt generating unit will read this register and in response, produce an MMU interrupt to the host processor in order to cause it to read the MMU interrupt storage register and find that the requested buffer memory space has become available and allocated to the packet number in the storage register. This packet number can be used by the host processor to load a transmit data packet from the transmit queue in system memory to the transmit queue being maintained in buffer memory 34.

After the packet number is no longer needed by the medium access control unit, the pages allocated to this packet number can be released by transmitting a Release $F(N_{Ti})$ or $F(N_{Rj})$ to page allocation and management unit 61, along with the packet number. This release operation involves simply deleting each occurrence of the assigned packet number $N_{Ti}$, $N_{Rj}$ in the third row of the table of FIG. 7C, and to insert therefor in each corresponding column in the second row, the free-marker "F".

The operation of memory management unit 35 is different when attempting to satisfy a request $R_{Rj}$ presented by the medium access control unit in order to obtain a packet number and storage space in buffer memory 34. Unlike a request $R_{Ti}$ from the host processor seeking a packet number and storage space for a transmit data packet of known byte length, the length of an incoming data packet is typically not known to medium access control units performing most protocols, for example, the Ethernet® protocol. Moreover, even in certain networks using the IEEE 802.3 protocol, where data count information is provided, the medium access control unit in principle will not want to rely on this information. Thus, when receiving an incoming data packet, an alternative procedure for memory storage requisition is carried out by the memory management unit of the first embodiment. This alternative procedure will be described below.

When a memory storage request $R_{Rj}$ from the medium access storage unit appears at packet number assignment unit 62 as shown, a sequence of operations occur. First, a "page request" signal is generated and transmitted to page allocation and management unit 61. In response to the page request signal, the second row of the table of FIG. 7C is searched to determine if there is a free page available for allocation to an available packet number. As in the case of transmit packet requests, if there is a free page available at the time of the page request signal, then the available packet number is assigned to the incoming data packet $D_{Rj}$ and then it is written into the third row of the table of FIG. 7C, below the free page. Then, page allocation and management unit 61 transmits to packet number assignment unit 62, a "page request granted" signal, and upon receipt thereof, the packet number assignment unit 62 counts a first page as having been allocated to the assigned packet number. At this stage of the process, the memory management unit does not know if a single page of buffer memory is sufficient to store the incoming data packet. However, presuming that a single page of buffer might be sufficient, packet number assignment unit 61 places the assigned packet number $N_{Rj}$ onto data line 53B. The assigned packet number is transmitted to MAC interface unit 31 and stored in the packet number storage register (not shown). The medium access control unit reads this register and uses the packet number to load the first page of data bytes into the first allocated page in buffer memory 34. The process by which packet loading occurs involves linear-to-physical address conversion using the packet number and address on conversion unit 60. Notably, only linear addresses corresponding to a first page (e.g. 256 data Bytes) are generated and provided to the address conversion unit in order to write in the first data page of the incoming data packet. The details of this address conversion process will be described in detail hereinafter.

If another page buffer memory is required to store the complete incoming data packet, then the medium access control unit presents to the packet number assignment unit 62, a second request for an additional page of memory to be allocated to the originally assigned packet number. The above-described page allocation process is carried out by again transmitting a page request signal to page allocation and management unit 61. If an additional free page is found after searching the table of FIG. 7C, then this page is allocated to the originally assigned packet number, and the data in the table of FIG. 7C is used to update page allocation information contained in address conversion unit 60. Then, a page request granted signal is transmitted to packet number assignment unit 62. In response, the assigned packet number is again placed onto lines 53B and appears in the packet number storage register in the MAC interface unit. This prompts the medium access control unit to write the second page of the incoming data packet into buffer memory 34. This is achieved by simply providing to the address conversion unit, the assigned packet number and a set of linear addresses corresponding to the second page of data bytes within the incoming data packet. For each additional page needed to store the incoming data packet, the above process of additional page requisition, page allocation, address conversion information updating, linear address generation and packet number presentment, is performed. When sufficient pages have been allocated and the entire incoming data packet is received and stored into buffer memory 34, the data packet and page allocation table of FIG. 7C will be complete, and using this table, the information regarding address conversion will have also been completely updated. At this stage, the medium access control unit will write the assigned packet number $N_{Rj}$ into the insert storage location of second FIFO storage unit 33. In this way, when the assigned packet number $N_{Rj}$ is read out from FIFO storage unit 33 by the host processor during data packet unloading operations, this packet number and its complete range of linear addresses will simply ensure access to the corresponding data packet, wherever it may be physically stored in buffer memory. Thereafter, a receive interrupt to the host processor is generated automatically as described hereinabove, in order to notify the host processor that a receive data packet is stored in memory buffer 34 and is ready for unloading.

If, however, during the page request and allocation process described above there is not a free page available, then reception of the incoming data packet will be lost. This is because the medium access control unit does not have ample buffering capabilities; if it did, then it could buffer a page of incoming data bytes while awaiting for a free page of buffer memory to become available. When a free page is not available, page allocation and management unit 61 generates a "page request denied" signal that is transmitted to packet number assignment unit 62. In response, an invalid packet number is placed on data lines 53B and the medium access control unit will issue a free $F(N_{Rj})$ to page allocation and management unit 61 in order to release all pages allocated to the assigned packet number which corresponds to the incoming data packet "lost" due to insufficient buffer storage space. This release operation involves simply detecting each occurrence of the assigned packet number in the third row of the table of FIG. 7C, and to insert therefor in each corresponding column of the second row, the free-marker "F".

Having described the function and operation of page allocation and packet number assignment in the memory management unit of the first embodiment, attention is now directed to the address conversion unit thereof.

In general, address conversion unit 60 converts each set of linear addresses generated for a particular data packet, into a corresponding set of physical addresses in buffer memory 34. Most importantly, it does so in a manner completely transparent to the host processor and the medium access control unit. To carry out this address conversion process, address conversion unit 60 requires information regarding the relationship between each packet number ($N_{Ti}$ or $N_{Rj}$) and the pages allocated to it at any particular instant in time. This information is, of course, not static but rather changes over time in a dynamic manner. For example, at one instant when packet number $N_{Ti}=0$ is assigned to a long transmit data packet, this packet number may have eight pages ($C_K$) allocated to it; whereas at a later time, when packet number $N_{Rj}=0$ is assigned to a short data packet, this packet number may have only one page ($C_K$) allocated to it. This time variant nature of page allocation and packet number assignment is characteristic of dynamic page allocation and dynamic packet number assignment of the present invention.

As illustrated in FIG. 7B, the Address Conversion Table shown embodies essential information regarding the relationship between each valid packet number and the pages allocated to it by page allocation and management unit 61. This Address Conversion Table is simultaneously constructed during memory allocation, using the information contained in the table of FIG. 7C. To achieve the necessary data transfer functions, write and data lines 65 and 66 are provided between units 60 and 61, as shown.

As illustrated, the Address Conversion Table has eighteen columns, one column for each packet number. Initially, these packet numbers, ranging from 0 through 17, can be allocated to either type of packet upon a first-come-first-serve basis, as described above. As shown, the Address Conversion Table has eight rows, each row corresponding to a page of data (e.g., 256 bytes) within a packet. For each data packet, either stored or about to be stored in buffer memory, a packet number has been assigned and each page of data in the data packet will most likely not be stored in the same page of buffer memory. For example, the data bytes comprising transmit data packet $D_{T0}$, assigned packet number "0", are stored in pages ($C_K$) 0, 1, 2, 10 and 15. By searching for the assigned packet number in the table, the physical page locations (i.e., $C_K$) in buffer memory can be simply determined.

As illustrated in FIGS. 6 and 7A, each linear address has a first linear address component $A_1$ and a second linear address component $A_2$. As discussed hereinabove, the first linear component within the memory management unit, represents the page of a particular data byte within the data packet, whereas second linear address component represents the location of the particular data byte within the specified page. Using this relationship, Address Conversion Unit 60 is reduced to generating a physical address A' which also has two components: the first physical address component $A_1'$ being the physical page location $C_K$, and the second physical address component $A_2'$ being the physical location of each byte within the physical page location $C_K$. This process is achieved for transmit data packets (i) by using the packet number and the address conversion table of FIG. 7B, to convert "on the fly" the three-bit linear address component $A_1$ into the five bit physical address component $C_K$, to which linear address component $A_1$ has been allocated; and (ii) by simultaneously passing the eight-bit linear address component $A_2$ to the output, to provide the eight bit physical address component $A_2'$. The result is a thirteen-bit physical address $A_{Ti}'=\{C_K, A_2\}$ where $C_k$ represents the five most significant bits and $A_2$ represents the eight least significant bits. The thirteen-bit physical address $A_{Ti}'$ is then provided to the address port of buffer memory 34, to facilitate reading out and writing in data bytes of the corresponding data packet. The above address conversion process is performed in the same manner for each receive data packet $D_{Rj}$, in which each linear address $A_{Rj}=\{A_1, A_2\}$ is converted into physical address $A_{Rj}'=\{C_K, A_2\}$, defined above.

The first embodiment of the present invention described above is characterized by the capability of mapping a data packet into one or more fixed length pages (of 256 bytes) of buffer memory, in a completely transparent and memory efficient manner. This technique is preferred in applications where buffer memory is to be provided on a single-chip communication controller, and efficient memory utilization is a consideration more important than high capacity data packet queuing within the communication controller. In an alternative second embodiment of the present invention, it is possible to enhance data packet queuing within the communication controller, at the expense, however, of less efficient memory utilization. This can be achieved by simply making the storage capacity of each page in buffer memory equal to the byte length of memory access windows $W_{cpu}$ and $W_{MAC}$, which in the second illustrated embodiment is also 2 kilobytes in length. The second embodiment of the present invention will now be described below, with reference to FIGS. 9, 10, 10A, 10B and 10C.

Figure 9:
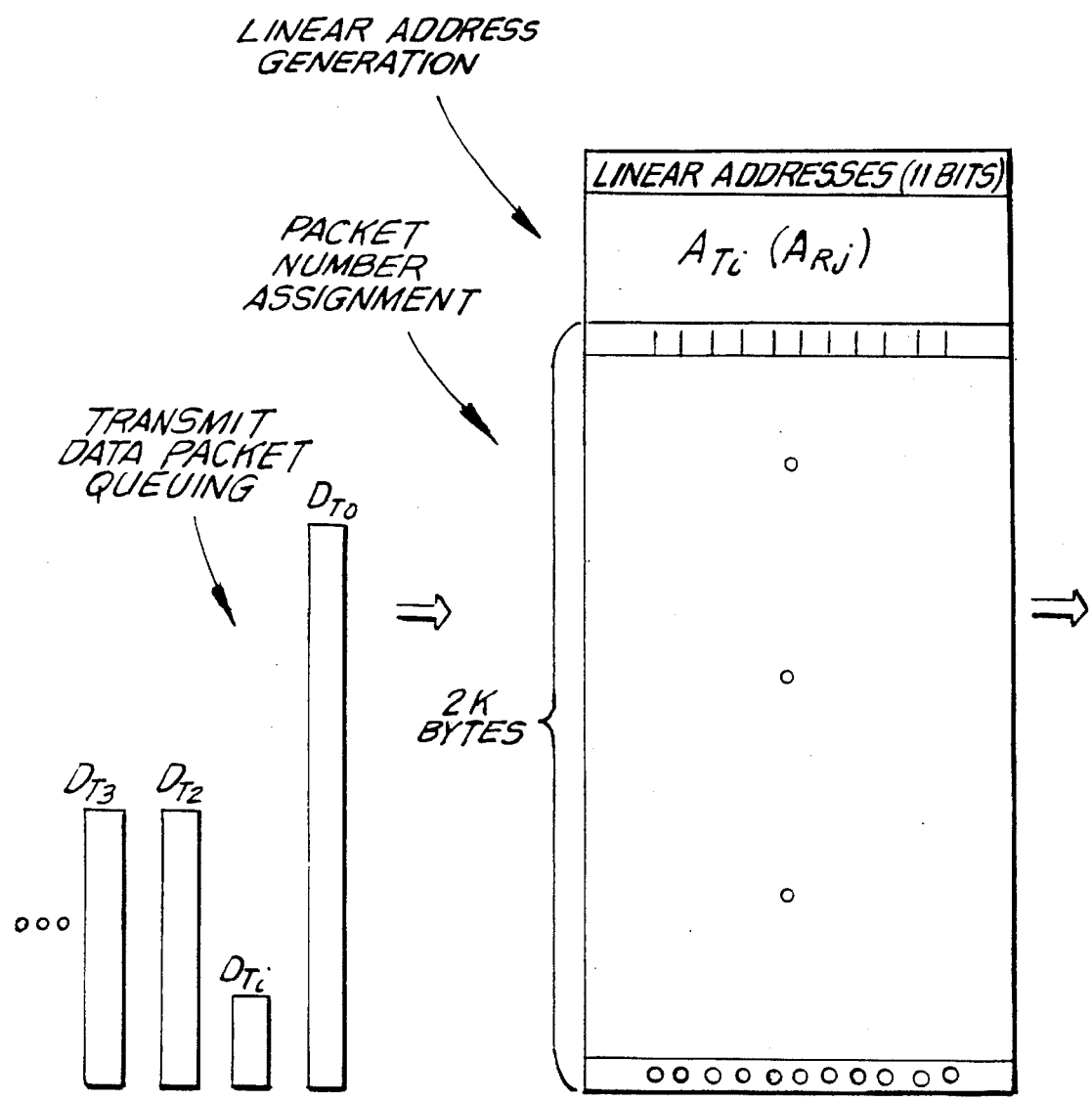
FIGS. 9 and 9A, taken together, provides a schematic representation of a method of data packet buffering according to a second embodiment of the present invention, illustrating data packet queuing in system memory, packet number assignment, linear address generation for data packets to be transferred to external buffer memory, and linear-to-physical address conversion for storage of the data packets.
Figure 9A:
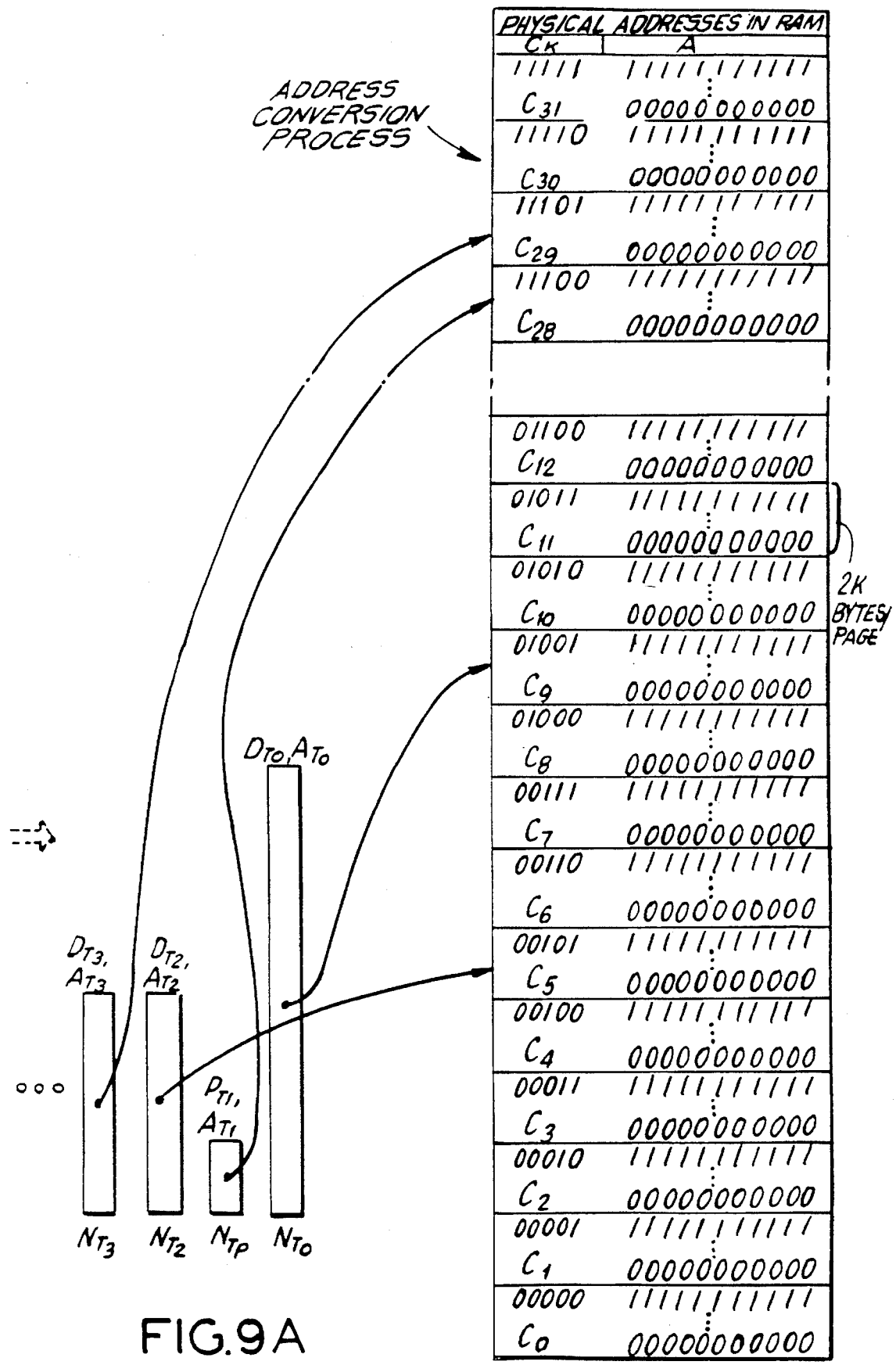

In FIGS. 9 and 9', the process of accessing buffer memory according to the second embodiment of the invention, is illustrated. Queuing of data packets in the second embodiment is identical to that in the first embodiment. The packet number assignment process is, however, slightly different in the second embodiment, in that a packet number will be assigned to a data packet so long as a single free page in buffer memory is available for allocation. If there is such a free page available, then the page will be allocated to an available packet number and thereafter this packet number will be assigned to the data packet requesting buffer storage space and a packet number. There is no need for the memory management unit to make two or more page requests in order to allocate sufficient buffer memory to store a particular length data packet.

In the second embodiment, linear address generation is same as in first embodiment. Again, the purpose of the linear address generation process is to generate a set of linear addresses which define the length of the data packet and to use these linear addresses to either write into or read from memory access windows $W_{cpu}$ or $W_{Mac}$, the data packet assigned to a particular packet number.

As illustrated in FIGS. 9 and 9', address conversion in the second embodiment is different in one important respect. That is, each data packet written into or read from a memory access window $W_{cpu}$ or $W_{Mac}$, is about to be or has been stored within a single page of buffer memory, which in the exemplary embodiment, has a length of 2 kilobytes. The details of this address conversion process will be described hereinafter in connection with the communication controller of the second embodiment.

Figure 10:
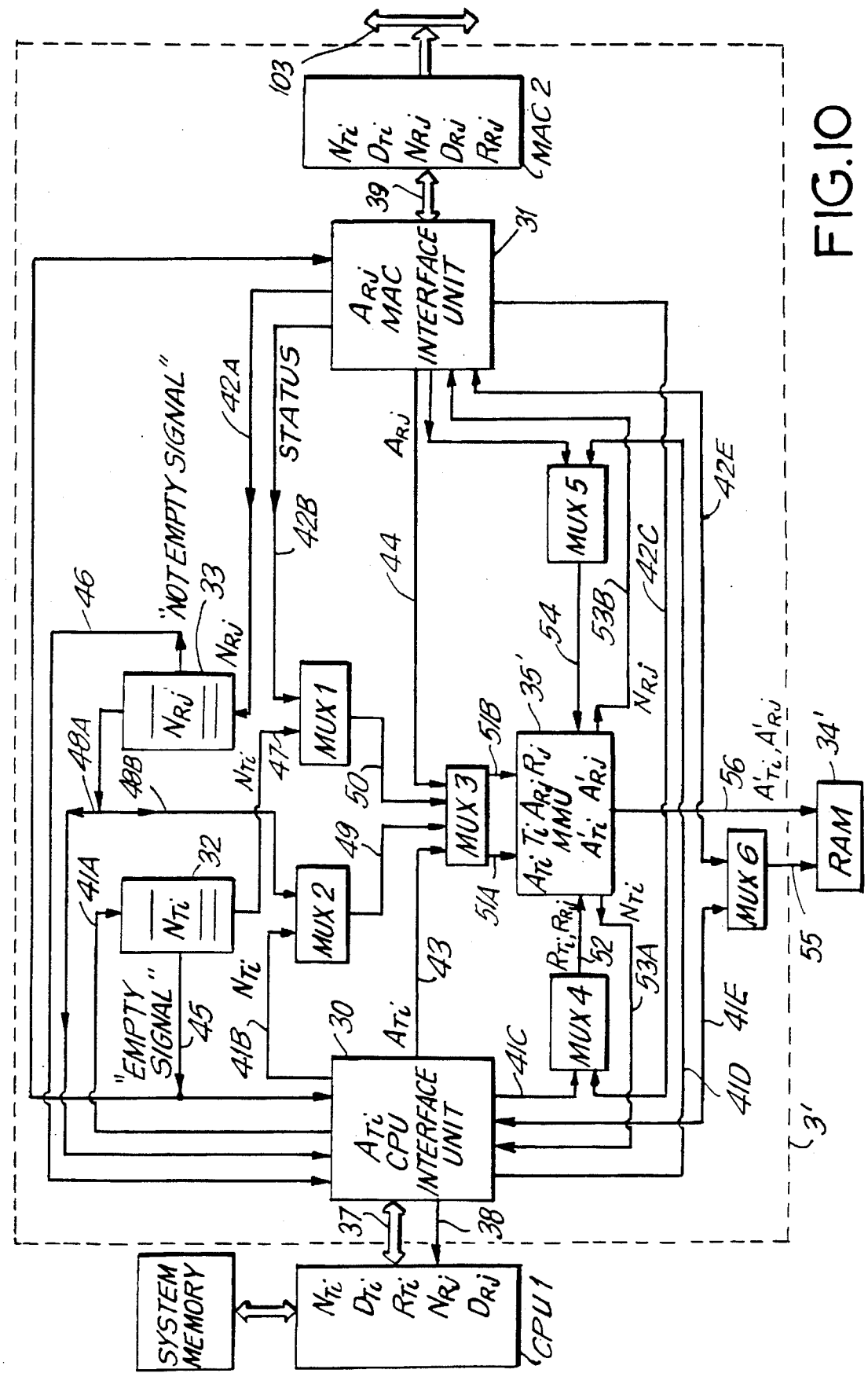
FIG. 10 is a block functional diagram of the communication controller according to the second embodiment of the present invention, showing its subcomponents interfaced between the host processor and the medium access control unit, with the external buffer memory interfaced with the memory management unit and other subcomponents.

In FIG. 10, a communication controller 3' according to the second embodiment of the present invention, is shown. All structural components of this embodiment are identical to those shown in FIG. 7 in connection with single chip communicator controller 3 of the first embodiment. As such, similar structures are indicated by similar reference numbers. One apparent difference shown in FIG. 10 is that buffer memory 34' is not contained on the communication controller 3', but is realized on a separate IC chip interfaced with communication controller chip 3' of the second embodiment.

Figure 10A:
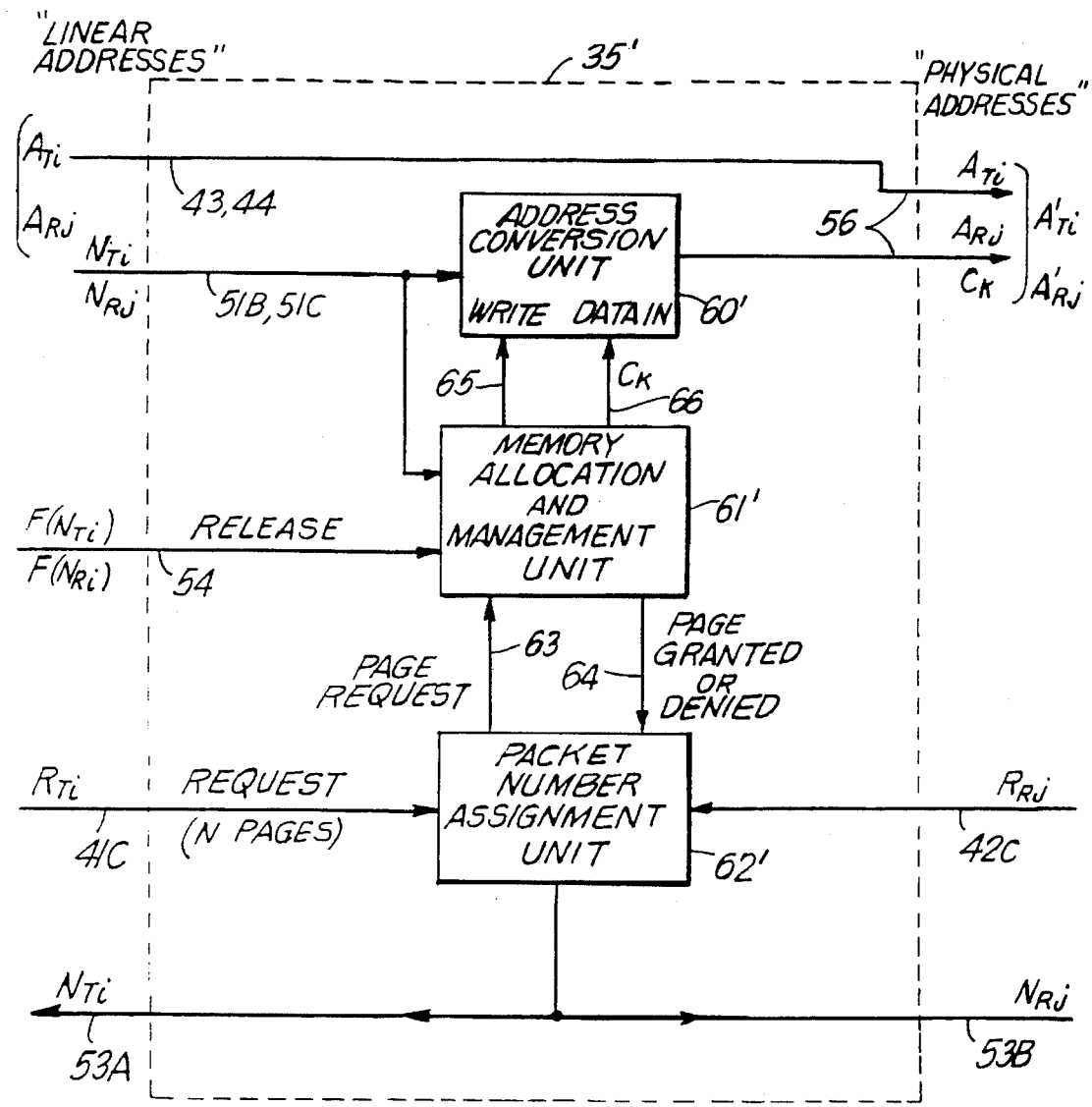
FIG. 10A is a block functional diagram of the memory management unit of the communication controller of FIG. 10.

FIG. 10A illustrates the functional subcomponents of the memory management unit of the second embodiment of the present invention. As illustrated, memory management unit 35' comprises address conversion unit 60', memory allocation and management unit 61' and packet number assignment unit 62', which are functionally analogous to their corresponding units in the memory management unit of FIG. 7A.

Packet number assignment unit 62' is adapted to receive Requests $R_{Ti}$ and $R_{Rj}$ from the host processor and medium access control unit respectively, and in response engages memory allocation and management unit 61' to search for and allocate a free page to the data packet associated with the request. If a free page exists, then it is allocated to an available packet number which is written into the third row of the table of FIG. 10C. This table is maintained by memory allocation and management unit in a manner similar to the table of FIG. 7C. Also, as illustrated in FIG. 10C, each free page of memory is indicated by the free-marker "F", to facilitate identification of free pages during each page request search through the table. Aside from the fact that the table of FIG. 10C accounts for thirty-two pages in external buffer memory 34', the principal difference with this table is that only one physical page location (i.e., $C_K$) is allocated to each packet number. This is consistent with the principle that each data packet can be stored entirely within a single page of allocated buffer memory.

If the host processor presents a request $R_{Ti}$ to packet number assignment unit 62', the packet number assignment unit will transmit a page request signal to memory allocation and management unit 61', which, in response, searches through the second row of the table of FIG. 10C in order to find the first free-marker "F". Upon finding the first free-marker, the available packet number is written into the third row in the same column entry occupied by the first free-number; the free marker is deleted; and a page request granted signal is transmitted to packet number assignment unit 61'. In response, packet number assignment unit 61 places the assigned packet number onto data lines 53A, which transmits the packet number to the transmit interrupt storage register in CPU interface unit 30. The host processor immediately reads this request to obtain the assigned packet number.

If memory allocation and management unit 62' does not find any free pages available in buffer memory 34' after a search through table of FIG. 10C, then a page request denied signal is transmitted to packet number assignment unit 61', which in response, transmits an invalid packet number to the transmit interrupt storage register in CPU interface unit 30. Upon reading this register, the host processor ascertains that a buffer memory is presently not available for storage of a transmit data packet, and thus must await for a MMU interrupt to be generated. Upon transmission of the page request denied signal, page allocation and management unit 62' continues to search the second row of the table of FIG. 10C until a free-marker is found. At this point, the corresponding page is allocated to the available packet number and the packet number allocation unit transmits a (valid) assigned packet number to the MMU interrupt storage register, by way of data lines 53A. The interrupt generator reads this register and in response, generates a MMU interrupt to the host processor, notifying it that a packet number has been assigned to its request for data storage space in buffer memory 34'.

If the medium access control unit presents a request $R_{Rj}$ to packet number assignment unit 62', the packet number assignment unit will transmit a page request signal to memory allocation and management unit 61'. The page allocation unit 61' will search for a free page and allocate it when found, in a manner performed in connection with satisfying request $R_{Ti}$. The result is a packet number transmitted to the receive interrupt storage register in MAC interface unit 31, where it is read by the medium access control unit. If, however, a free page is not available, the memory allocation and management unit will not continue to search for a free page, and thus the incoming data packet will become lost.

As with the memory management unit of the first embodiment, allocated pages can be released by both the host processor or the medium access control unit by presenting to page allocation and management unit 62', a Release $F(N_{Ti})$, $F(N_{Rj})$ simultaneously with the corresponding packet number, as described hereinbefore in connection with communication controller of FIG. 7. Each released page in buffer memory 34' will thereafter hold the free-marker "F" in each corresponding page entry location in the table of FIG. 10C.

When writing into or reading from data packet windows $W_{CPU}$ and $W_{MAC}$, linear addresses must be converted into physical addresses, as discussed hereinbefore. The address conversion process occurring in address conversion unit 60', utilizes the Address Conversion Table of FIG. 10B. This Table is functionally analogous to the address conversion table of FIG. 7B. To achieve necessary data transfer, write and data lines 65 and 66 are provided between unit 60' and 61' as shown. Again, all of the data in the table of FIG. 10B is obtained from the table of FIG. 10C, which is used to update the Address Conversion Table after each new page allocation, as well as page release operation within memory allocation and management unit 61'.

Alternatively, however, instead of using a table to implement address conversion unit 60', a simple one-to-one identity function, such as $C_K=N_{Ti}$, can be used in effectuating linear-to-physical address conversion. Advantageously, this approach eliminates the use of the Table of FIG. 10B and markedly simplifies the Table of FIG. 10C by eliminating the need to maintain the third row thereof.

As illustrated in FIG. 10A, each linear address $A_{Ti}$ (and $A_{Rj}$) has eleven-bits which represent within the memory management unit of the second embodiment, the physical location of the particular data byte within the data packets. The page within the buffer memory is not specified by these linear addresses. For transmit data packets, the address conversion process is achieved (i) by using the packet number and the address conversion table of FIG. 10B (or function $C_K=N_{Ti}$, to convert "on the fly" the packet number $N_{Ti}$ into the five-bit physical address component $C_K$, to which the packet number $N_{Ti}$ has been pre-allocated; and (ii) by simultaneously passing to the output line 56, the eleven-bit linear address component $A_{Ti}$ which is representative of the eleven bit address component $A_2$. Each resulting sixteen-bit physical address $A_{Ti}'=\{C_K, A_{Ti}\}$ is then provided to the address port of buffer memory 34 to facilitate reading out or writing in the bytes of the corresponding data packet. The above address conversion process is performed in the same manner for receive data packets $D_{Rj}$, in which each eleven bit linear address $A_{Rj}$ is converted into a sixteen-bit physical address $A_{Rj}'=\{C_K, A_{Rj}\}$.

The communication controller of the above described embodiments generate transmit and receive interrupts to the host processor by detecting empty and not empty signals from the transmit and receive packet number queues 32 and 33, respectively. Using this technique, transmit interrupts are generated only when the entire transmit packet number queue 32 is empty, whereas receive interrupts are generated any time there is at least one packet number in the receive packet number queue 33. In certain applications, however, it may be desired or required to generate a transmit interrupt after each data packet transmission or after the completion of a predetermined number (M) of data packet transmissions which constitute the data of a particular record or data packet sequence being transmitted. Unlike transmit interrupts, however, the generation of a receive interrupt after each data packet reception will be required in nearly all applications, as it is uncertain as to when or whether subsequent data packet receptions will occur. In addition to such flexible transmit interrupt generation capabilities described above, buffering of corresponding packet numbers would also be desired in order to avoid the need of maintaining software-based packet number queues in system memory, for transmit status monitoring operations. To achieve these objectives, several transmit interrupt generating mechanisms are described below.

In FIG. 11, a third embodiment of the communication controller of the present invention, is shown. All major structural components of this communication controller 3" are identical to those shown in FIG. 7, and as such, similar structures are indicated by similar reference numerals. The only significant difference shown in FIG. 11 is that first packet number queue 32' comprises a functionally independent FIFO storage unit 32A' which is connected to the insert storage location of functionally independent FIFO storage unit 32B'. Also, the first removal location of the transmit packet number queue 32' is connected to the first input on multiplexer $M_1$ by way of line 47'. The removal storage location of FIFO storage unit 32B' provides the second removal storage location of the transmit packet number queue 32' and, is connected to CPU interface unit 30 by way of line 70, in order to provide packet numbers to the host processor when needed during transmit status monitoring operations. In order to generate transmit interrupts to the medium access control unit (i.e. to initiate unloading of transmit data packets), the "not empty" port of FIFO storage unit 32A' is connected to MAC interface unit 31 by way of line 45A'. Similarly, in order to generate transmit interrupts to the host processor (i.e., CPU), the "not empty" port of FIFO storage unit 32B' is connected to CPU interface unit 30 by way of line 45B'.

Figure 11A:
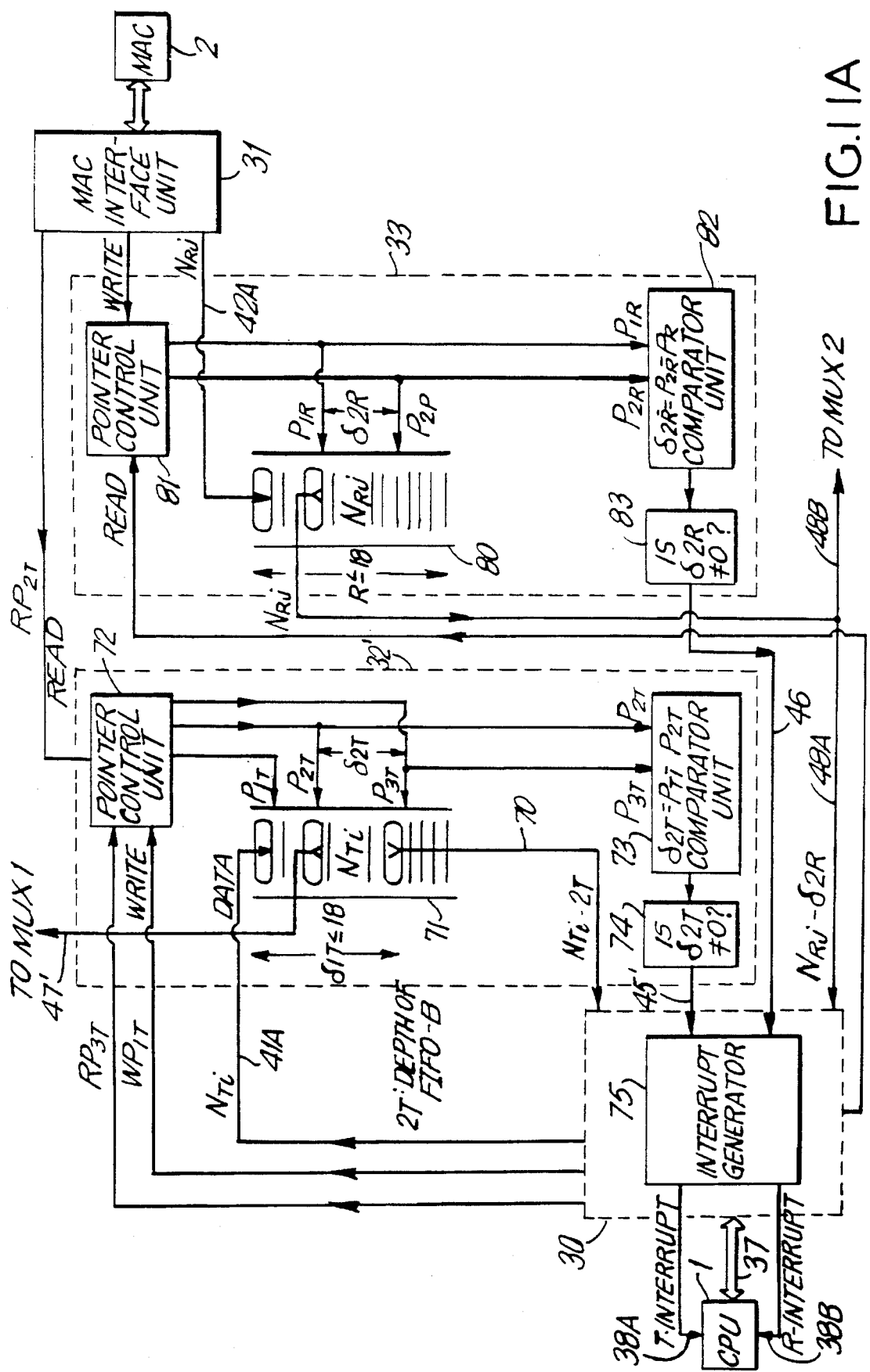
FIG. 11A is a block functional diagram of the transmit and receive packet number queues and CPU interface unit of one embodiment of the communication controller of FIG. 11.
Figure 1B:
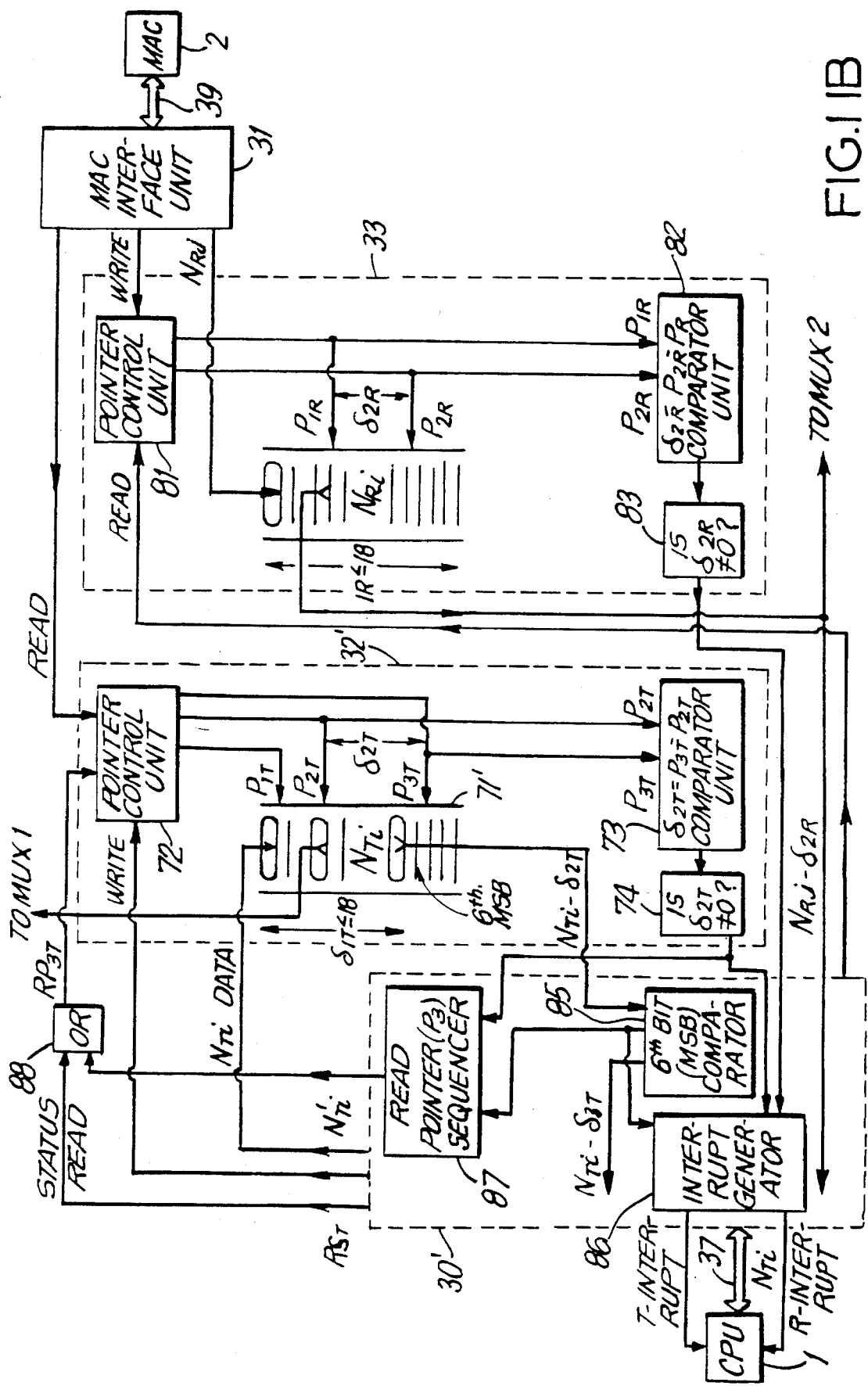

To obtain a clearer understanding of the transmit interrupt generating mechanism of this aspect of the invention, reference is made to FIG. 11A which illustrates an embodiment of the packet number queues within communication controller 3". While transmit packet number queue 32A' can be implemented as a pair of discrete FIFO storage units configured in the manner illustrated in FIG. 11, a more efficient approach is illustrated in FIG. 11A. In particular, a single FIFO storage unit 71 of storage depth 18 is addressed using a pointer control system 72 that functionally emulates a transmit packet number queue having a single insert location and first and second removal locations. As illustrated, pointer control system 72 generates pointers $P_{1T}$, $P_{2T}$ and $P_{3T}$ in response to write signal $WP_{1T}$ and read signals $RP_{1T}$ and $RP_{2T}$, respectively. Write signal $WP_{1T}$ is generated by the host processor (i.e. CPU) and is provided to pointer control unit 72 in order to move (i.e. advance) point or $P_{1T}$. By this operation, pointer $P_{1T}$ is able to designate (i.e. address), at each instance in time, the insert location into which each packet number $N_{Ti}$ is to be written in FIFO storage unit 71 by the host processor after completion of a transmit packet loading operation. Read signal $RP_{2T}$ is generated by the medium access control unit and is provided to pointer control unit 72 in order to move pointer $P_{2T}$. By this operation, pointer $P_{2T}$ is able to designate, at each instance in time, the first removal location from which each packet number can be read and provided to multiplexer $M_1$, as illustrated in FIG. 11. Notably, each such packet number corresponds to the next data packet awaiting transmission. Read signal $RP_{3T}$, on the other hand, is generated by the host processor and is provided to pointer control unit 72 in order to move pointer $P_{T3}$. By this operation, pointer $P_{3T}$ is able to designate, at each instant in time, the second removal location from which each packet number $N_{Ti-S2T}$ can be read by CPU interface unit 30, as shown.

In order to generate a "not empty" signal when a packet number resides in the second portion of the transmit queue (i.e., between pointers $P_{2T}$ and $P_{3T}$), arithmetic unit 73 and comparator unit 74 are provided. In operation, arithmetic unit 73 compares pointers $P_{T3}$ and $P_{T2}$ (i.e. compute $\delta_{2T}=P_{3T}-P_{2T}$) and this value $\delta_{2T}$ is then provided to comparator unit 74. In the illustrated embodiment, pointers $P_{1T}$, $P_{2T}$ and $P_{3T}$ are each 5-bit words. If $\delta_{2T} \neq 0$, indicative of the second portion of the transmit queue not being empty, then a logical "1" is generated; otherwise a logical "0" is generated. The output of comparator unit 74, in turn, is provided to the interrupt generating circuit 75 in CPU interface unit 30. Only if the output of comparator unit 74 is a logical "1", then a transmit interrupt to the host processor is generated. As illustrated, packet number $N_{Ti-\delta 2T}$ at the second removal location can be read by CPU interface unit 30, as shown.

As illustrated in FIG. 11A, receive packet number queue 33 is conventional in that it comprises a single FIFO storage unit 80 of storage depth 18. FIFO storage unit 80 includes one insert location, one removal location, and a non-empty signal port. Pointer control unit 81 generates pointers $P_{1R}$ and $P_{2R}$ in response to write signal $WP_{1R}$ and read signal $RP_{2R}$, respectively. Write signal $WP_{1R}$ is generated by MAC interface unit 31 and is provided to pointer control unit 81 in order to move (i.e., advance) pointer $P_{1R}$. By this operation, pointer $P_{1R}$ is able to designate, at each instance in time, the insert location into which each packet number $N_{Rj}$ is to be written in FIFO storage unit 80 by the medium access control unit after completion of a receive packet loading operation. Read signal $RP_{2R}$, on the other hand, is generated by host processor and is provided to pointer control unit 81 in order to move pointer $P_{2R}$. By this operation, pointer $P_{2R}$ is able to designate, at each instance in time, the sole removal location from which each packet number $N_{Rj-\delta 2R}$ is provided to multiplexer $M_2$ and can be read by CPU interface unit 30, as shown in FIG. 11. Notably, each such packet number corresponds to the next received data packet awaiting to be unloaded by the host processor.

In order to generate a "not empty" signal when a packet number resides in the receive packet number queue (i.e., in locations addressed between pointers $P_{1R}$ and $P_{2R}$) arithmetic unit 82 and comparator unit 83 are provided. In operation, arithmetic unit 82 compares pointers $P_{2R}$ and $P_{1R}$ (i.e., computes $\delta_{2R}=P_{2R}-P_{1R}$) and this value $\delta_{2R}$ is then provided to comparator unit 83. In the illustrated embodiment, pointers $P_{1R}$ and $P_{2R}$ are each 5-bit words. As in the transmit queue, if $\delta_{2R} \neq 0$, indicative of the receive queue not being empty, then a logical "1" is generated; otherwise a logical "0" is generated. The output of comparator unit 83, in turn, is provided to the interrupt generating circuit 75 as shown. Only if the output of comparator unit 83 is a logical "1", then a receive interrupt to the host processor is generated. As illustrated, packet number $N_{Rj-\delta 2R}$ at the sole removal location of the receive queue 33, is provided to CPU interface unit 30 for storage in a receive packet number storage register (not shown) which is readable by the host processor.

As a result of the transmit queue structure illustrated in FIG. 11A and described above, transmit interrupts are automatically generated for each packet number, and each such packet number is accessible to the host processor without requiring storage of the sequence of issued packet numbers $\{N_{Ti}\}$ in system memory.

While not shown, the pointer control system of the transmit packet number queue will include an arithmetic unit and comparator unit of the type described above for generating "not empty" signals provided to the MAC interface unit 31 over line 45A', as illustrated in FIG. 11.

In order to provide yet greater flexibility in the generation of host processor interrupts, and in particular to selectively generate transmit interrupts after transmission of a particular number of data packets, the communication controller of FIGS. 11 and 11A is further modified as shown in FIG. 11B. In such an embodiment, transmit packet number queue 32' and receive packet number 33 of FIG. 11B are similar to those illustrated in FIG. 11A, with the provision of minor modifications to the transmit packet number queue 31" described below.

Specifically, each storage location of FIFO storage unit 71' in FIG. 11B is six bits in length, rather five bits as in FIG. 11A. The sixth MSB bit is provided in order to encode the occurrence of a "transmit interrupt" upon transmission of the corresponding transmit data packet. In the illustrated embodiment, the host processor adds either an interrupt generation bit (e.g. "1") or a non-interrupt generation bit (e.g. "0") to each assigned 5-bit packet number $N_{Ti}$ in order to produce a stream of encoded packet numbers $\{N_{Ti}'\}$ to CPU interface unit 30', as shown. Which packet numbers to encode for transmit interrupt generation, can be decided, for example, on the basis of the known length of each particular record or sequence of packets to be transmitted. In this way, if a transmitted message contains five data packets, then only the fifth (i.e. last) data packet number $N_{T4}$ need be encoded to generate a transmit interrupt upon completion of data packet transmission of the particular data packet sequence. In such an exemplary case, the packet number sequence $\{N_{Ti}'\}$ issued and stored in transmit queue 33' might be, for example, as follows: {000000, 000001, 000010, 000011, 100101}. The transmit interrupt issued to the host processor upon detection of the interrupt generation bit of packet number $N_{T4}$, in essence, notifies the host processor that this particular data packet sequence has been transmitted.

As illustrated in FIG. 11B, CPU interface unit 30' is also different from CPU interface unit 30 in several important respects. First, a sixth-bit (MSB) comparator unit 85 is provided to determine whether the sixth bit of the packet number $N_{Ti-\delta 2T}$ at the "second removal location," is either "1" or "0", with the former indicating interrupt generation, as discussed above. All six bits of the packet number $N_{Ti-\delta 2T}$ from the sixth bit comparator output are readable by the host processor. The output of comparator units 74 and 83 are provided to interrupt generating circuit 86, as shown. The 5-bit packet number $N_{Rj-\delta 2R}$ read from the sole removal location of receive packet number queue 80 is also readable by the host processor.

In order to enable CPU interface unit 30' to sequentially search through transmit packet number queue 71' until an interrupt-generation bit (i.e. a logical "1") is found within the sixth-bit of a packet number in the second portion transmit queue, a read pointer ($P_3$) sequencer 87 is provided. As shown, read pointer sequencer 87 is provided with two inputs, namely, the output of comparator unit 74 and the output of sixth-bit comparator unit 85. The output of read pointer sequencer 87, in turn, is provided to the first input of logical OR gate 88. The read signal for transmit status determination, $RS_T$, is provided to the second input of OR gate 88. The output of OR gate 88, on the other hand, is a read pulse signal $RP_{3T}$ which is provided to pointer control unit 72 in order to selectively control the movement of pointer $P_{3T}$.

Read pointer sequencer 87 operates as follows. The output of read pointer sequencer 87 will be logical "1" only when (i) $\delta_{2T}$ is not equal to "0" (indicative that the second portion of the transmit queue is not empty) and (ii) the output of sixth-bit comparator unit 85 is "0". Under such conditions, read pointer $P_3$ sequentially advances through the transmit packet number queue 71'. This is achieved by sequentially providing read pulse signal $RP_{3T}$ to pointer control unit 72, by way of OR gate 88. During this time interval, CPU interface unit 30' maintains transmit status read signal $R_{ST}$ at logical "0". When the output of sixth bit comparator 85 is "1", indicative of the presence of an interrupt-generating bit in the packet number at which pointer $P_3$ is pointing, the read pointer sequencer 87 will stop sequencing, and a transmit interrupt to the host processor will be generated from interrupt generating unit 86. The position of pointer $P_3$ at this state defines the second removal location from which the interrupt encoded packet number is read out, and can be used to read transmit status data from the corresponding data packet in buffer memory 34. Notably, this transmit interrupt is a reliable indication that the data packets associated with a particular record or packet sequence, have been successfully transmitted. Also, whenever the second portion of packet number queue 71' is empty, $\delta_{27}=0$ and thus read pointer sequencer 87 will stop sequencing.

While the sixth MSB bit of each packet number in packet number queue 71' is considered in generating transmit interrupts, only the five LSB bits of packet numbers $N_{Ti}'$ need be considered by the medium access control unit. Consequentially, in this particular embodiment of the invention, the sixth bit of each packet number $N_{Ti}'$ can simply be ignored by the medium access control unit during its operations.

To complete the detailed description of the communication controllers of the first, second and third embodiments of the present invention, brief attention is now accorded to the medium access control unit.

Medium access control unit 2 is best described in terms of the communication control functions which it performs. However, full appreciation of the control operations of medium access control unit is best achieved by obtaining a more complete understanding of the CSMA/CD protocol.

Figure 8B:
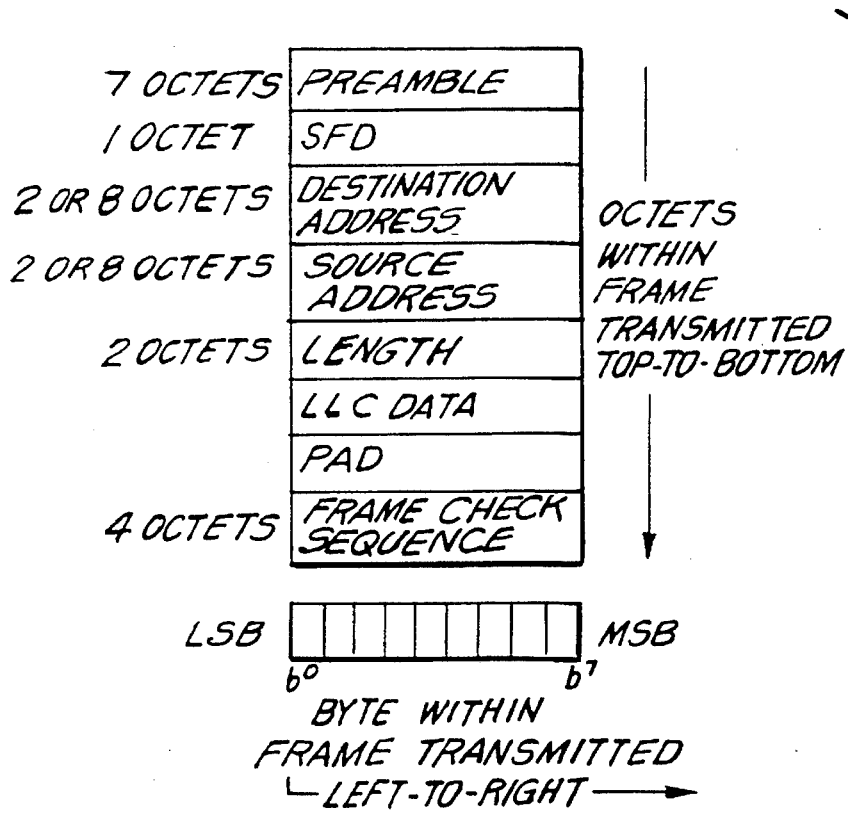
FIG. 8B is a schematic representation of the data packet transmission format employed by the communication controller of the illustrated embodiment during transmission of data packets over the network communication medium.

In the CSMA/CD protocol, only one type of "data packet" may be placed on or otherwise transmitted over the communication medium. The transmission format of data packets within this scheme, is illustrated in FIG. 8B. As shown, the data packet transmission format consists of a sequence of octets placed on a common communication channel.

According to the transmission format, seven octets are first transmitted over the communication channel. These seven octets function as a preamble and, in essence, initiate the medium access control unit of each station to enter a "sense mode" to determine if a data packet is being received. The next octet transmitted is a start of frame delimiter (SFD). Then, two or six octets are transmitted in sequence, identifying the destination address of the data packet. Here, each station's medium access control unit processes this data to determine if the destination address equals its address. If not, then each such station returns to its idle listening state. As for the station (or stations) for which the packet is destined, its medium access control unit continues to process the subsequent octets as follows. The next two or six octets define the address of the sender, which is determined by and stored in the medium access control unit. The subsequent two octets define the length or count of the data packet. Thereafter, each subsequent octet transmitted contains a byte of data within the data packet. At the end of the data bytes, four octets are transmitted as a packet check (i.e., CRC) sequence.

Having described the structure and function of the communication controllers of the illustrated embodiments, it is appropriate at this juncture to describe the operation of the communication controllers in connection with the loading and unloading of data packets in both data transmission and reception modes of operation. While the description of operation applies equally to communication controllers of the first, second and third embodiments, the communication controller of FIG. 7 will be selected for illustration purposes.

Referring to FIGS. 5A, 7, 8A, and 11A, loading of a transmit packet into buffer memory 34 by the host processor, will be considered.

As illustrated in FIG. 12A, the first step in loading a data packet involves the host processor requesting allocation of a particular number of pages from the memory management unit. The request $R_{Ti}$ will continue to be outstanding until the number of pages required are allocated and an assigned packet number is issued to the host processor. Then, the assigned packet number is written into the packet number input port of the memory management unit. The packet byte count is then written into the third and fourth byte locations in packet window $W_{cpu}$. Thereafter, data bytes of packet $D_{Ti}$ are copied from the transmit data queue in system memory into window $W_{cpu}$, starting at the fifth data byte storage location defined in the window. After loading data packet into buffer memory 34, the host processor writes the packet number used to load the transmit data packet, into the insert storage location of transmit packet number queue 32. Thereafter, the host processor resumes its normal operations, and will not act upon the just loaded packet number until a transmit interrupt is generated.

Figure 12B:
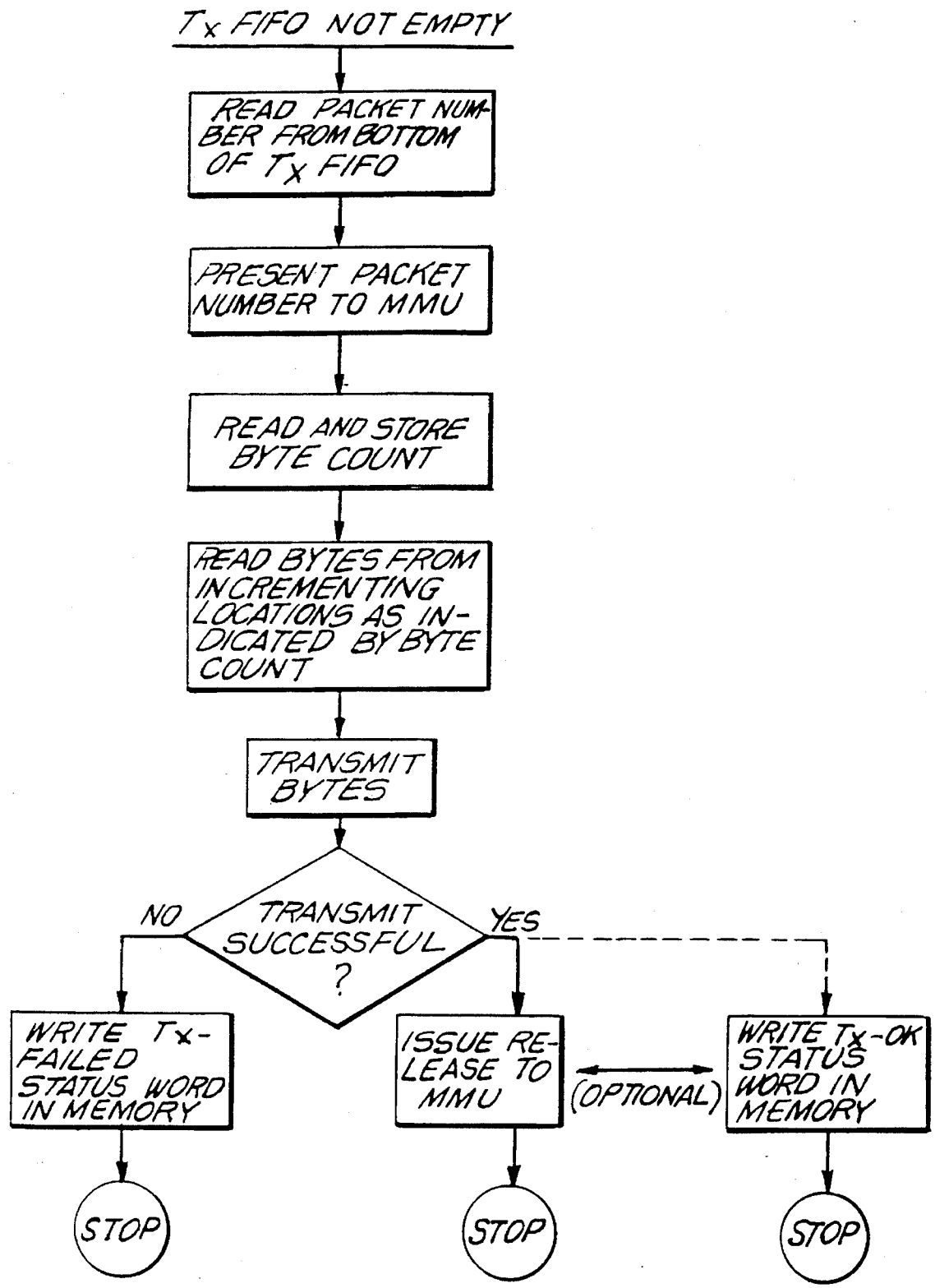
FIG. 12B is a flow control diagram illustrating operations undertaken by the medium access control unit during unloading of a transmit data packet from the data packet buffer memory of the communication controllers of FIGS. 7, 10 and 11.

In FIG. 12B, the operations involved in unloading a transmit data packet from the buffer memory, are illustrated. When the medium access control until is not engaged in its data packet reception mode, it can unload transmit data packet from buffer memory 34 provided there is a packet number in removal storage location of the first FIFO storage unit (i.e., transmit packet number queue) 32. To determine if this condition exists, the "empty" signal transmitted from FIFO storage unit 32 to MAC interface unit 31 over line 45, is checked to determine its value. If it is logical "0", then there is at least one packet number $N_{Ti}$ in FIFO storage unit 32; otherwise, if it is logical "1", then the FIFO storage unit is empty and no transmit packet unloading is possible. In response, the medium access control unit first reads a packet number from the removal location FIFO storage unit 32. This packet number is then transmitted to the packet number input port of the memory management unit, to generate physical addresses corresponding to stored data packet. Then the byte count in the third and fourth byte storage locations in the memory access window $W_{mac}$ are read out by the medium access location control unit and stored. Notably, this byte count indicates what the linear length of the linear addresses must be in order to read out the data bytes of the stored packet. The data bytes of the stored packet are then read (i.e., copied) from the memory access window $W_{mac}$ by generating linear addresses indicated by the byte count. These unloaded data bytes are transmitted over the communication medium in the normal course. If the data transmission is successful, then the medium access control unit may simply release the pages allocated to the unloaded transmitted data packet. Alternatively, it can write transmit "pass" status bytes into first and second byte locations of window $W_{mac}$, to the host processor.

If at any time first FIFO storage unit 32 is empty, a signal indicative of this condition is transmitted from the first storage unit to the CPU interface unit, which, in turn, is used to generate a transmit interrupt to the host processor. This interrupt serves to notify the host processor that transmit data packets from system memory can be loaded into the buffer memory, and that all previous transmits are completed.

Figure 13A:
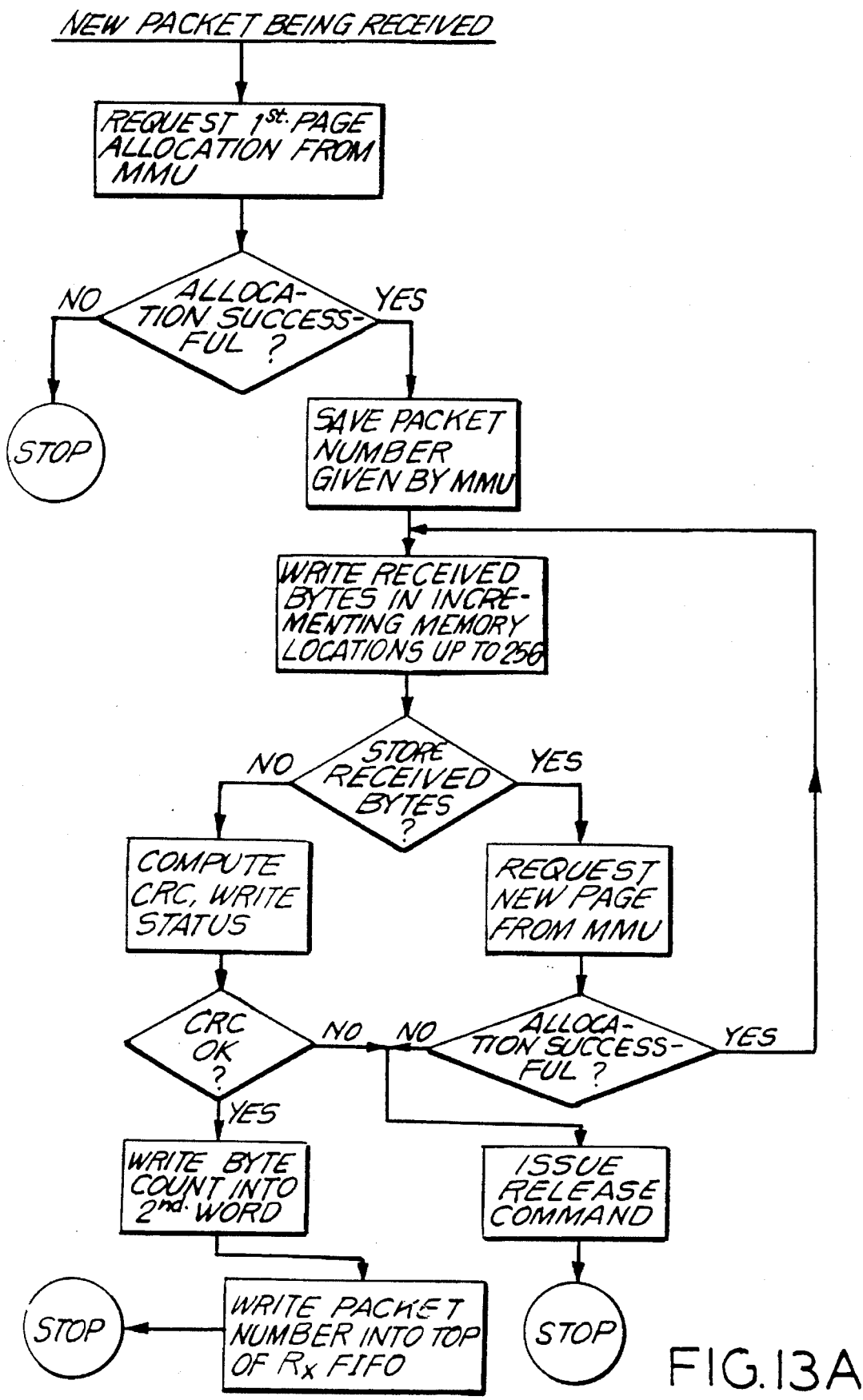
FIG. 13A is a flow control diagram illustrating operations undertaken by the medium access control unit during loading of an incoming receive data packet into the data packet buffer memory of the communication controller of FIG. 7.

Referring to FIG. 13A, loading of "receive data packet into buffer memory 34 will be considered. Upon indication that an incoming data packet is being received, the medium access control until issues a Request $R_{Rj}$ to the memory management unit, for a first page of allocated memory and an assigned packet number $N_{Rj}$. If the allocation is unsuccessful, then the incoming packet cannot be received. If, however, memory page allocation is successful, then the assigned packet number is temporarily stored and used to write up to 252 data bytes into the memory access window $W_{mac}$, starting at the fifth byte location. If no additional data bytes are incoming, then the error checking (CRC) code is used to validate the received data, and on the basis of such validation, receive status bytes are written into first and second byte locations of memory access window $W_{mac}$. Also, the byte count is written into the third and fourth byte locations of the memory access window $W_{mac}$. Finally, the receive packet number is written into the insert location of second FIFO storage unit 33, while a receive interrupt to host processor is generated by a "Not Empty" signal transmitted from the second FIFO storage unit 32 to CPU interface unit 30, over line 46.

If additional bytes are being received, the memory access control unit will make a request for a second free page of buffer memory, using the same assigned packet number. If the second page is allocated, the additional data bytes will be written into this new page. This process of page requisition and allocation and data byte storage is repeated as many as eight times if necessary, in order to store the incoming data packet. After checking the validity of received data (i.e., through CRC) and writing receive status and byte count data into the first four byte locations of the memory access window $W_{mac}$, the packet number is written into the insert location of second FIFO storage unit 33, while a receive interrupt to host processor is generated as described above. In the event of an invalid CRC, or any storage request $R_{Rj}$ is denied, then all allocated pages associated with the assigned packet number will be released.

Figure 13B:
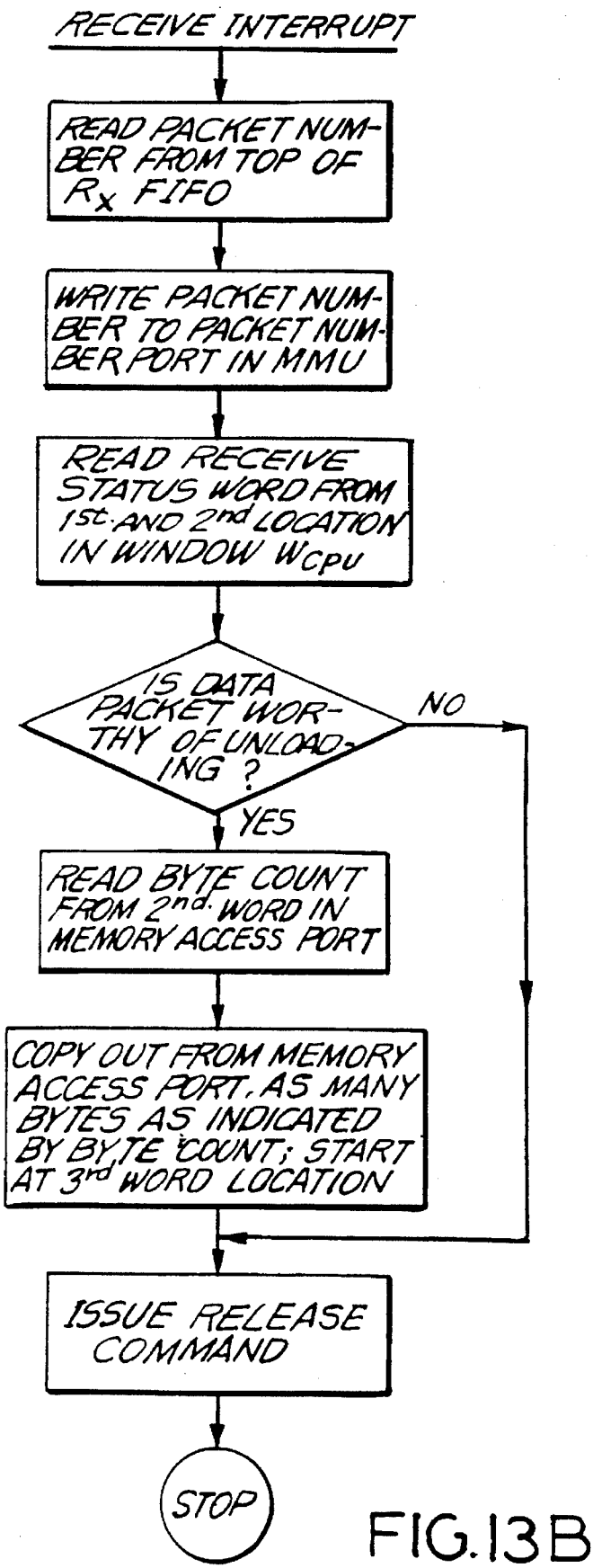
FIG. 13B is a flow control diagram illustrating operations undertaken by the host processor during unloading of a receive data packet from the data packet buffer memory of the communication controller of FIGS. 7.

Referring to FIG. 13B, unloading of receive data packets will be considered. Upon receiving a receive interrupt, the host processor reads the packet number from removal location of second FIFO storage unit 33. Note that the receive packet number is also presented to multiplexer $M_2$. The receive status data is then read from first and second byte locations in window $W_{cpu}$. If this receive status data indicates that the associated packet data is worthy of unloading, then the byte count is read out from the third and fourth byte locations in window $W_{cpu}$, and are then stored. Thereafter, starting from the fifth byte location through those locations indicated by the byte count, data bytes of the packet are read from buffer memory 34. The host processor then issues release command $F(N_{Rj})$ to free those pages allocated to packet number $N_{Rj}$.

In the illustrated embodiments of the present invention, the storage units of the transmit and receive packet number queues were realized using FIFO storage units 32 and 33. Notably, however, it is expected that other types of suitably modified storage devices can be used with good results.

While the particular embodiments shown and described above will be useful in many applications in the data communication art, further modifications of the present invention herein disclosed will occur to persons skilled in the art to which the present invention pertains. All such modifications are deemed to be within the scope and spirit of the present invention defined by the appended claims.

What is claimed is:

1. A method of buffering data elements between first and second processors, said method comprising the steps:

(a) using a memory management unit to operably connect said first and second processors to a buffer memory having plurality of data storage locations for storage of one or more data elements;

(b) said memory management unit assigning a unique number to a data element to be transferred from either said first processor or said second processor to said buffer memory, and stored in one or more of said data storage locations;

(c) said memory management unit storing said data element in one or more of said data element storage locations, by (1) said first processor generating a first set of addresses ranging from a first minimum address value to a first maximum address value, and (2) said memory management unit using the number assigned to said data element in step (b) and said first set of addresses to generate a corresponding set of physical addresses which define the physical location of said one or more data storage locations in said buffer memory;

(d) maintaining a first memory structure, for storing one or more of said numbers, each said number corresponding to one stored data element and said first memory structure being accessible to said first and second processors;

(e) said first processor or said second processor storing in said first memory structure, the number assigned to said stored data element in step (b);

(f) said first or second processor retrieving said stored number from said first memory structure; and (g) said memory management unit retrieving said data element stored in said one or more data storage locations during step (c), by (1) said first processor or said second processor generating a second set of addresses ranging from a second minimum address value to a second maximum address value, and (2) said memory management unit using the number assigned to said data element in step (b) and said second set of addresses to generate the corresponding set of physical addresses which define the physical location of said one or more data storage locations in said buffer memory.

2. The method of claim 1, where in step (d), said first memory structure has a plurality of storage locations including an insert storage location at which each number is inserted into said first memory structure, and a removal storage location from which each number is removed from said first memory structure.

3. The method of claim 2, wherein step (e) comprises said memory management unit storing said assigned number in said insert storage location of said first memory structure, and step (f) comprises said memory management unit removing said number from said removal storage location of said first memory structure.

4. The method of claim 1, wherein step (b) further comprises (1) said memory management unit determining the number of data storage locations required to store said data element, (2) said memory management unit allocating said required number of free data storage locations for storing said data element, and (3) said memory management unit assigning said number to each of said allocated data storage locations.

5. The method of claim 1, which further comprises said first processor maintaining independent of said memory management unit, a second memory structure for storing one or more data elements to be transferred from said first processor to said second processor by way of said memory management unit, and wherein step (c) comprises:

(3) said first processor transferring said data element from said second memory structure to said memory management unit, and said memory management unit transferring said data element to said one or more data storage locations specified by said generated set of physical addresses.

6. The method of claim 5, wherein step (g) further comprises (3) said memory management unit transferring the retrieved data element from said one or more data storage locations to said second processor.

7. The method of claim 6, which further comprises after step (g), (4) said memory management unit providing said generated set of physical addresses to said buffer memory, and (5) said memory management unit writing status data from said second processor, into said one or more data element storage locations specified by said generated set of physical addresses.

8. The method of claim 7, which further comprises after steps (4) and (5), (6) said memory management unit providing said generated set of physical addresses to said buffer memory, and (7) said memory management unit reading said status data from said data storage locations specified by said generated set of physical addresses.

9. The method of claim 5, which further comprises said second processor maintaining independent of said memory management unit, a third-memory structure for storing one or more data elements transferred to said first processor from said second processor, and wherein step (c) further comprises (3) said second processor transferring said data element from said third memory storage to said memory management unit, and said memory management unit transferring said data element to said one or more data storage locations specified by said generated set of physical addresses.

10. The method of claim 9, wherein step (g) further comprises (3) said memory management unit transferring said data elements from said one or more data storage locations specified by said generated set of physical addresses, to said first processor.

11. The method of claim 10 which further comprises after step (g), (4) said memory management unit providing said generated set of physical addresses to said buffer memory, and (5) said memory management unit writing status data from said first processor, into said one or more data storage locations specified by said generated set of physical addresses.

12. The method of claim 11, which further comprises after steps (4) and (5), (6) said memory management unit providing said generated set of physical addresses to said buffer memory, and (7) said memory management unit reading said status data from said one or more data storage locations specified by said generated set of physical addresses.

13. A memory management unit for managing a buffer memory having a plurality of data storage locations for storing one or more data elements, said memory management unit comprising:

interface means for operably connecting said memory management unit to said buffer memory and a first processor and a second processor, wherein both said first and second processors include means for transmitting and receiving data elements;

number assignment means for assigning a number to each data element to be stored in said buffer memory and allocating one or more of said data storage locations for storing each said data element to be stored;

address bit receiving means for receiving one or more sets of address bits from said first processor or said second processor, each said set of address bits corresponding to one said data element to be stored and ranging from a minimum address value to a maximum address value;

physical address generating means for generating a set of physical addresses for each data element to be stored in said buffer memory, by using the number assigned to said data element to be stored and said set of address bits corresponding to said data element to be stored, each set of physical addresses corresponding to one or more of said data storage locations in said buffer memory and providing access to said one or more data storage locations;

data element transfer means for transferring data elements between said first processor and said buffer memory, and for transferring data elements between said buffer memory and said second processor;

a number storage means for storing a plurality of numbers, each said number stored in said number storage means being accessible by said first processor and said second processor; and number transfer means for transferring said numbers from said number storage means to said second processor and said first processor, and for transferring numbers from said number assignment means to said second processor and said first processor.

14. The memory management unit of claim 13, wherein said number storage means has a plurality of storage locations including a first insert storage location at which each said number is inserted into said number storage means, and a first removal storage location from which said each number is removed from said number storage means.

15. The memory management unit of claim 14, wherein said number assignment comprises memory determining means for determining the number of data storage locations required for storing each said data element, memory allocating means for dynamically allocating said required number of free data storage locations to said data element, and assignment means for dynamically assigning the corresponding number to each said allocated free data storage locations.

16. The memory management unit of claim 14, wherein each said set of physical addresses specifies at least one byte of memory for storage of status data regarding each corresponding data element, and wherein said data element transfer means selectively transfers said status data (i) from said second processor to said at least one byte of memory storage, and (ii) from said at least one byte of memory storage, to said first processor.

17. The memory management unit of claim 13, wherein there is a fixed address increment between each consecutive pair of address values.

18. The memory management unit of claim 13, wherein a first predetermined number of the most significant bits of said set of address bits represent a predetermined number of data storage locations in said buffer memory, and wherein a second predetermined number of the least significant bits of said set of address bits represent the range of data bytes contained in each said predetermined number of data storage locations in said buffer memory.

19. The memory management unit of claim 15, wherein said number assignment means further comprises memory releasing means operably associated with said memory allocating means, for releasing data storage locations allocated to an assigned number, in response to a release request made in connection with said assigned number.

20. The memory management unit of claim 13, wherein said number storage means comprises a FIFO storage device.

21. A method of buffering data elements between first and second processors, said method comprising the steps:

(a) using a memory management unit to operably connect said first and second processors to a buffer memory having plurality of data storage locations for storage of one or more data elements;

(b) said memory management unit assigning a unique code to a data element to be transferred from either said first processor or said second processor to said buffer memory, and stored in one or more of said data storage locations;

(c) said memory management unit storing said data element in one or more of said data element storage locations, by (1) said first processor generating a first set of addresses ranging from a first minimum address value to a first maximum address value, and (2) said memory management unit using the code assigned to said data element in step (b) and said first set of addresses to generate a corresponding set of physical addresses which define the physical location of said one or more data storage locations in said buffer memory;

(d) maintaining a first memory structure for storing one or more of said codes, each said number corresponding to one stored data element and said first memory structure being accessible to said first and second processors;

(e) first processor or said second processor storing in said first memory structure, the code assigned to said stored data element in step (b);

(f) said first or second retrieving said stored code from said first memory structure; and (g) said memory management unit retrieving said data element stored in said one or more data storage locations during step (c), by (1) said first processor or said second processor generating a second set of addresses ranging from a second minimum address value to a second maximum address value, and (2) said memory management unit using the code assigned to said data element in step (b) and said second set of addresses to generate the corresponding set of physical addresses which define the physical location of said one or more data storage locations in said buffer memory.

22. The method of claim 21, where in step (d), said first memory structure has a plurality of storage locations including an insert storage location at which each code is inserted into said first memory structure, and a removal storage location from which each code is removed from said first memory structure.

23. The method of claim 22, wherein step (e) comprises said memory management unit storing said assigned code in said insert storage location of said first memory structure, and step (f) comprises said memory management unit removing said number from said removal storage location of said first memory structure.

24. The method of claim 21, wherein step (b) further comprises (1) said memory management unit determining the code of data storage locations required to store said data element, (2) said memory management unit allocating said required number of free data storage locations for storing said data element, and (3) said memory management unit assigning said code to each of said allocated data storage locations.

25. The method of claim 21, which further comprises said first processor maintaining independent of said memory management unit, a second memory structure for storing one or more data elements to be transferred from said first processor to said second processor by way of said memory management unit, and wherein step (c) comprises:

(3) said first processor transferring said data element from said second memory structure to said memory management unit, and said memory management unit transferring said data element to said one or more data storage locations specified by said generated set of physical addresses.

26. The method of claim 24, wherein step (g) further comprises (3) said memory management unit transferring the retrieved data element from said one or more data storage locations to said second processor.

27. The method of claim 26, which further comprises after step (g), (4) said memory management unit providing said generated set of physical addresses to said buffer memory, and (5) said memory management unit writing status data from said second processor, into said one or more data element storage locations specified by said generated set of physical addresses.

28. The method of claim 27, which further comprises after steps (4) and (5), (6) said memory management unit providing said generated set of physical addresses to said buffer memory, and (7) said memory management unit reading said status data from said data storage locations specified by said generated set of physical addresses.

29. The method of claim 25, which further comprises said second processor maintaining independent of said memory management unit, a third-memory structure for storing one or more data elements transferred to said first processor from said second processor, and wherein step (c) further comprises (3) said second processor transferring said data element from said third memory storage to said memory management unit, and said memory management unit transferring said data element to said one or more data storage locations specified by said generated set of physical addresses.

30. The method of claim 29, wherein step (g) further comprises (3) said memory management unit transferring said data elements from said one or more data storage locations specified by said generated set of physical addresses, to said first processor.

31. The method of claim 30, which further comprises after step (g), (4) said memory management unit providing said generated set of physical addresses to said buffer memory, and (5) said memory management unit writing status data from said first processor, into said one or more data storage locations specified by said generated set of physical addresses.

32. The method of claim 31, which further comprises after steps (4) and (5), (6) said memory management unit providing said generated set of physical addresses to said buffer memory, and (7) said memory management unit reading said status data from said one or more data storage locations specified by said generated set of physical addresses.

33. The method of claim 21, wherein each said code is representative of a different number.

34. A memory management unit for managing a buffer memory having a plurality of data storage locations for storing one or more data elements, said memory management unit comprising:

interface means for operably connecting said memory management unit to said buffer memory and a first processor and a second processor, wherein both said first and second processors include means for transmitting and receiving data elements;

code assignment means for assigning a code to each data element to be stored in said buffer memory and allocating one or more of said data storage locations for storing each said data element to be stored;

address bit receiving means for receiving one or more sets of address bits from said first processor or said second processor, each said set of address bits corresponding to one said data element to be stored and ranging from a minimum address value to a maximum address value;

physical address generating means for generating a set of physical addresses for each data element to be stored in said buffer memory, by using the code assigned to said data element to be stored and said set of address bits corresponding to said data element to be stored, each set of physical addresses corresponding to one or more of said data storage locations in said buffer memory and providing access to said one or more data storage locations;

data element transfer means for transferring data elements between said first processor and said buffer memory, and for transferring data elements between said buffer memory and said second processor;

a code storage means for storing a plurality of numbers, each said code stored in said number storage means being accessible by said first processor and said second processor; and number transfer means for transferring said codes from said code storage means to said second processor and said first processor, and for transferring codes from said code assignment means to said second processor and said first processor.

35. The memory management unit of claim 34, wherein said code storage means has a plurality of storage locations including a first insert storage location at which each said code is inserted into said code storage means, and a first removal storage location from which said each code is removed from said code storage means.

36. The memory management unit of claim 35, wherein said code assignment comprises memory determining means for determining the number of data storage locations required for storing each said data element, memory allocating means for dynamically allocating said required number of free data storage locations to said data element, and assignment means for dynamically assigning the corresponding code to each said allocated free data storage locations.

37. The memory management unit of claim 35, wherein each said set of physical addresses specifies at least one byte of memory for storage of status data regarding each corresponding data element, and wherein said data element transfer means selectively transfers said status data (i) from said second processor to said at least one byte of memory storage, and (ii) from said at least one byte of memory storage, to said first processor.

38. The memory management unit of claim 34, wherein there is a fixed address increment between each consecutive pair of address values.

39. The memory management unit of claim 34, wherein a first predetermined number of the most significant bits of said set of address bits represent a predetermined number of data storage locations in said buffer memory, and wherein a second predetermined number of the least significant bits of said set of address bits represent the range of data bytes contained in each said predetermined number of data storage locations in said buffer memory.

40. The memory management unit of claim 36, wherein said number assignment means further comprises memory releasing means operably associated with said memory allocating means, for releasing data storage locations allocated to an assigned code, in response to a release request made in connection with said assigned code.

41. The memory management unit of claim 34, wherein said code storage means comprises a FIFO storage device.

42. The memory management unit of claim 34, wherein each said assigned code represents a different number.

* * * * *